(12) United States Patent
Saito et al.

(10) Patent No.: US 11,196,602 B2
(45) Date of Patent: Dec. 7, 2021

(54) RADIO TRANSMISSION DEVICE AND RADIO RECEPTION DEVICE

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/651,133

(22) PCT Filed: Sep. 29, 2017

(86) PCT No.: PCT/JP2017/035751
§ 371 (c)(1),
(2) Date: Mar. 26, 2020

(87) PCT Pub. No.: WO2019/064602
PCT Pub. Date: Apr. 4, 2019

(65) Prior Publication Data
US 2020/0295979 A1    Sep. 17, 2020

(51) Int. Cl.
*H04L 27/26* (2006.01)
*H04W 74/00* (2009.01)

(52) U.S. Cl.
CPC ...... *H04L 27/2613* (2013.01); *H04L 27/2605* (2013.01); *H04W 74/004* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 2019/0173546 A1* | 6/2019 | Kim | H04L 27/2695 |
| 2020/0052944 A1* | 2/2020 | Zhang | H04W 72/04 |
| 2020/0162303 A1* | 5/2020 | Kim | H04L 5/10 |
| 2020/0196332 A1* | 6/2020 | Yokomakura | H04W 72/1268 |
| 2020/0228384 A1* | 7/2020 | Saito | H04L 27/2657 |
| 2020/0235979 A1* | 7/2020 | Yokomakura | H04L 27/261 |
| 2020/0351135 A1* | 11/2020 | Moroga | H04L 5/0082 |

FOREIGN PATENT DOCUMENTS

| | | |
|---|---|---|
| WO | 2017/130490 A1 | 8/2017 |
| WO | 2017/184865 A1 | 10/2017 |
| WO | 2018/225936 A1 | 12/2018 |

OTHER PUBLICATIONS

International Search Report issued in PCT/JP2017/035751 dated Dec. 5, 2017 (7 pages).

(Continued)

*Primary Examiner* — Anh Vu H Ly
(74) *Attorney, Agent, or Firm* — Osha Bergman Watanabe & Burton LLP

(57) ABSTRACT

A terminal is disclosed including a processor configured to map a phase tracking reference signal, PTRS, to at least one symbol used for an uplink shared channel starting from a leading symbol of the uplink shared channel; and a transmitter configured to perform transmission processing for the uplink shared channel and the PTRS. In other aspects, another terminal and a base station are also disclosed.

7 Claims, 24 Drawing Sheets

(56) References Cited

OTHER PUBLICATIONS

Written Opinion of the International Searching Authority issued in PCT/JP2017/035751 dated Dec. 5, 2017 (4 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
Office Action issued in Australian Application No. 2017433792, dated Nov. 16, 2020 (6 pages).
Notice of Reasons for Refusal issued in Japanese Application No. 2019-544198, dated Dec. 22, 2020 (12 pages).
3GPP TSG-RAN WG1 Meeting #89; R1-1707367; "On PT-RS for DFT-s-OFDM;" Intel Corporation; May 15-19, 2017; Hangzhou, China (7 pages).
3GPP TSG RAN WG1 NR Ad-hoc#2; R1-1710686; "On DL PT-RS design;" Samsung; Jun. 27-30, 2017; Qingdao, China (6 pages).
Office Action issued in the counterpart Japanese Patent Application No. 2019-544198, dated Mar. 9, 2021 (9 pages).
Extended European Search Report issued in counterpart European Patent Application No. 17926664.8, dated Apr. 26, 2021 (9 pages).
Samsung; "Discussions on DL/UL RS multiplexing"; 3GPP TSG RAN WG1 Meeting NR-AH#3, R1-1715965; Nagoya, Japan; Sep. 18-21, 2017 (7 pages).
Huawei, HiSilicon; "Summary of RS multiplexing"; 3GPP TSG RAN WG1 Meeting AH NR#3, R1-1716725; Nagoya, Japan; Sep. 18-21, 2017 (6 pages).
Guangdong OPPO Mobile Telecom; "On PDSCH and PUSCH Rate matching"; 3GPP TSG RAN WG1 Meeting NR#3, R1-1715670; Nagoya, Japan; Sep. 18-21, 2017 (2 pages).
Nokia, Nokia Shanghai Bell; "On remaining details on PT-RS design"; 3GPP TSG RAN WG1 NR Ad-hoc #3, R1-1716510; Nagoya, Japan; Sep. 18-21, 2017 (10 pages).
First Examination Report issued in Indian Application No. 202037018023; dated Jul. 27, 2021 (5 pages).

\* cited by examiner

RADIO TRANSMISSION DEVICE AND RADIO RECEPTION DEVICE

TECHNICAL FIELD

The present invention relates to a radio transmission device and a radio reception device.

BACKGROUND ART

Long Term Evolution (LTE) has been specified for achieving a higher data rate, lower latency, and the like in a Universal Mobile Telecommunication System (UMTS) network (see Non-Patent Literature (hereinafter referred to as "NPL") 1). Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT)), and the like.

The future radio communication systems (for example, 5G) are expected to support a broad range of frequencies ranging from a low carrier frequency to a high carrier frequency. The future radio communication systems are desired to flexibly support arrangement (mapping) of reference signals or the like since propagation channel environments and/or requirements greatly differ from one frequency to another (such as a low carrier frequency and high carrier frequency), for example.

For example, in the future radio communication systems, a reference signal (e.g., demodulation reference signal) of a port (layer) assigned to a user terminal is assumed to be arranged on radio resources based on various methods and transmitted to the user terminal. In that case, for example, a radio base station notifies a user terminal of the information on the port assigned to the user terminal and the information on a arrangement method for the reference signal (RS).

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

An RS called Phase Tracking Reference Signal (PTRS) has been considered to be introduced in the future radio communication systems. The PTRS is used for correcting and mitigating phase fluctuations that may occur in a downlink (DL) signal and/or uplink (UL) signal due to the effect of phase noise or the like. For this reason, the PTRS may also be referred to as "phase-fluctuation-correcting RS." A component of the phase noise by which common phase rotation is given independently of frequencies is sometimes referred to as "Common Phase Error (CPE)."

However, no definition has been made for the future radio communication systems on how the PTRS is mapped in what kind of arrangement in the DL and/or UL signal. Accordingly, there is a possibility that the effect of phase fluctuation is not compensated effectively depending on an arrangement method for the PTRS, and accordingly, an expected signal quality cannot be obtained.

One object of the present invention is to prevent quality degradation of a radio link signal due to the effect of phase noise or the like by effectively correcting a phase fluctuation in a propagation channel of the radio link signal.

Solution to Problem

A radio transmission device according to an aspect of the present invention includes: a transmitter that transmits a radio link signal including a phase tracking reference signal used for correcting a phase fluctuation in a propagation channel; and a controller that controls, based on a reference position in a time domain of the radio link signal, a position at which the phase tracking reference signal is to be mapped in the time domain of the radio link signal.

Advantageous Effects of Invention

According to one aspect of the present invention, it is possible to prevent quality degradation of a radio link signal due to the effect of phase noise or the like since a phase fluctuation in a propagation channel of the radio link signal can be effectively corrected.

DESCRIPTION OF EMBODIMENTS

Hereinafter, an embodiment of the present invention will be described in detail with reference to the accompanying drawings.

One Embodiment

Figure 1:
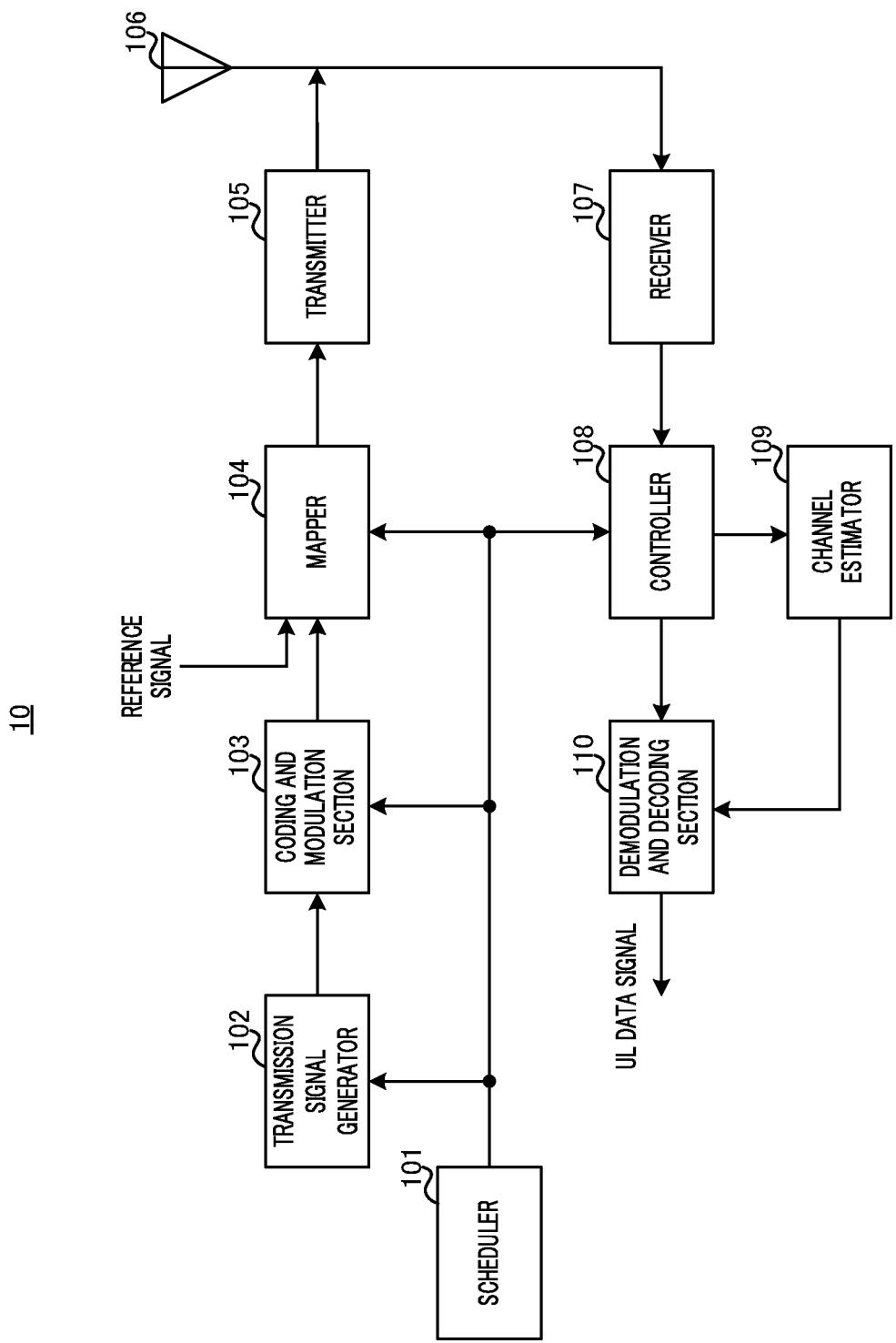
FIG. 1 is a block diagram illustrating an example of entire configuration of a radio base station according to one embodiment.
Figure 2:
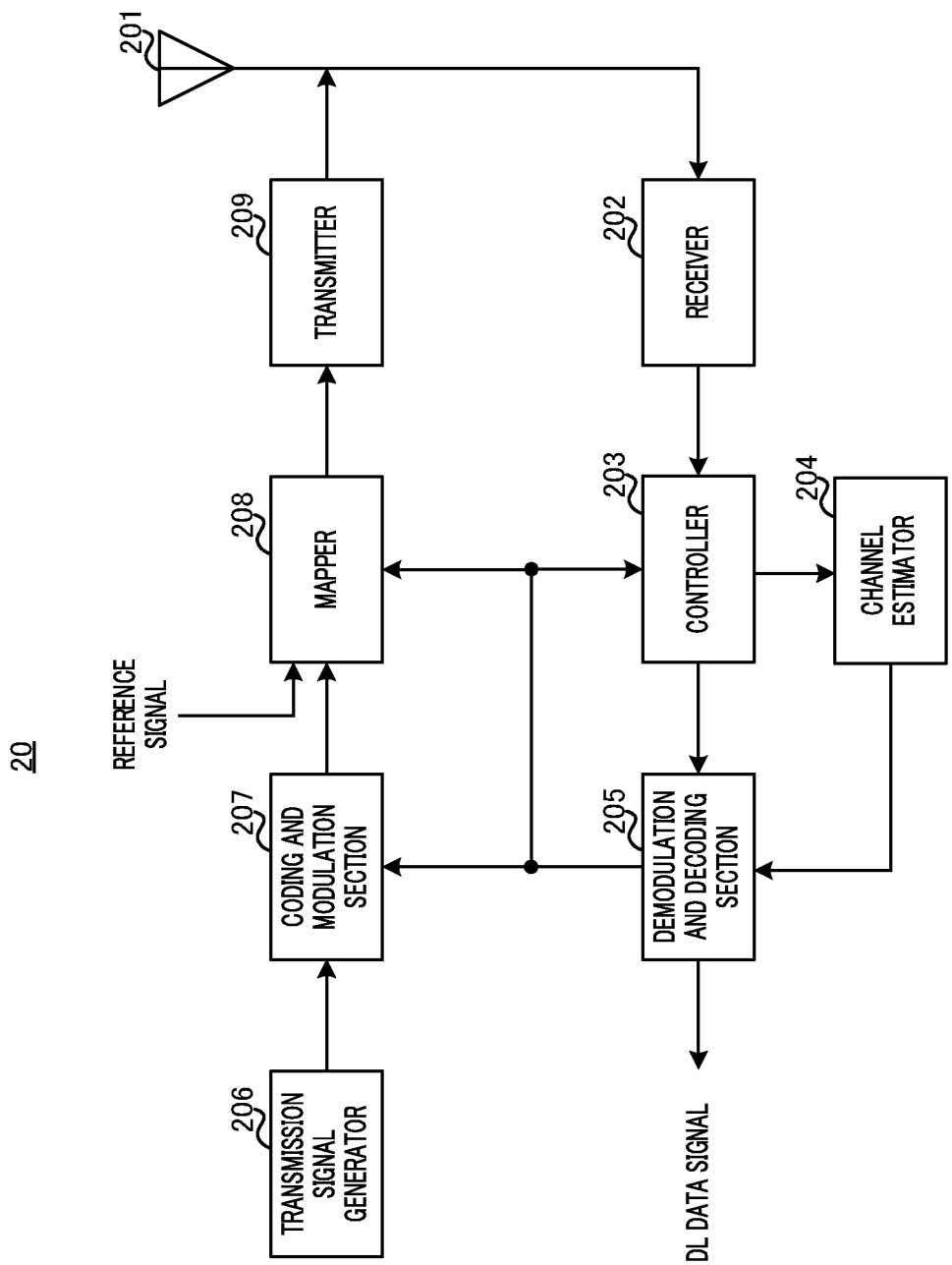
FIG. 2 is a block diagram illustrating an example of entire configuration of a user terminal according to one embodiment.

A radio communication system according to the present embodiment includes radio base station 10 (also referred to as eNodeB (eNB) or gNodeB (gNB), for example) as illustrated in FIG. 1, and user terminal 20 (also referred to as User Equipment (UE), for example) as illustrated in FIG. 2. User terminal 20 is wirelessly connected (wirelessly accesses) to radio base station 10. In other words, a radio link is formed between radio base station 10 and user terminal 20.

A radio signal which propagates through the radio link may be referred to as a radio link signal. The radio link in the direction from radio base station 10 to user terminal 20 may be referred to as downlink (DL). Accordingly, the radio link signal transmitted from radio base station 10 to user terminal 20 may be referred to as a DL signal. On the other hand, the radio link transmitted from user terminal 20 to radio base station 10 may be referred to as uplink (UL). Accordingly, the radio link signal transmitted from user terminal 20 to radio base station 10 may be referred to as a UL signal.

Radio base station 10 transmits a DL control signal to user terminal 20 using a DL control channel (e.g., Physical Downlink Control Channel (PDCCH)). Radio base station 10 transmits a DL data signal, demodulation reference signal, and/or PTRS to user terminal 20 using a DL data channel (e.g., Physical Downlink Shared Channel (PDSCH)). The demodulation reference signal is a signal used for demodulation of the DL data signal. Hereinbelow, the demodulation reference signal is referred to as DMRS, appropriately.

User terminal 20 transmits a UL control signal to radio base station 10 using a UL control channel (e.g., Physical Uplink Control Channel (PUCCH)) or UL data channel (e.g., Physical Uplink Shared Channel (PUSCH)). User terminal 20 transmits a UL data signal, DMRS, and/or PTRS to radio base station 10 using the UL data channel (e.g., UL shared channel (Physical Uplink Shared Channel (PUSCH))).

The radio communication system in the embodiment supports two types of mapping patterns (Configuration types 1 and 2) for DMRS(s), for example. In addition, the radio communication system in the embodiment supports various DMRS arrangement methods. The DMRS arrangement methods include an arrangement method in which the DMRS and the data signal are frequency-multiplexed, and an arrangement method in which the DMRSs of different ports are multiplexed, for example.

The downlink channel and uplink channel through which radio base station 10 and user terminal 20 transmit or receive are not limited to the aforementioned PDCCH, PDSCH, PUCCH, PUSCH, and the like. Other channels, such as a Physical Broadcast Channel (PBCH), Random Access Channel (RACH), or the like may be applicable as the downlink channel and uplink channel through which radio base station 10 and user terminal 20 transmit or receive, for example.

Further, as with FIGS. 1 and 2, the signal waveform of the DL and/or UL signal generated at radio base station 10 and user terminal 20 may be based on Orthogonal Frequency Division Multiplexing (OFDM) modulation. Alternatively, the signal waveform of the DL and/or UL signal may be based on Single Carrier-Frequency Division Multiple Access (SC-FDMA) or DFT-Spread-OFDM (DFT-S-OFDM). Alternatively, the signal waveform of the DL and/or UL signal may be another signal waveform. Components to generate a signal waveform (e.g., an IFFT processor, CP adder, CP remover, FFT processor, for example) are omitted in FIGS. 1 and 2.

<Radio Base Station>

FIG. 1 is a block diagram illustrating an example of entire configuration of radio base station 10 according to the embodiment. Radio base station 10 includes scheduler 101, transmission-signal generator 102, coding and modulation section 103, mapper 104, transmitter 105, antenna 106, receiver 107, controller 108, channel estimator 109, and demodulation and decoding section 110. Radio base station 10 may have a configuration for Multi-User Multiple-Input Multiple-Output (MU-MIMO) available to communicate simultaneously with a plurality of user terminals 20. Alternatively, radio base station 10 may have a configuration for Single-User Multiple-Input Multiple-Output (SU-MIMO) available to communicate with a single user terminal 20. Alternatively, radio base station 10 may have a configuration for both of SU-MIMO and MU-MIMO.

Scheduler 101 performs scheduling (e.g., resource allocation and port assignment) of a DL signal (DL data signal, DL control signal, DMRS, PTRS, for example). In addition, scheduler 101 performs scheduling (e.g., resource allocation and port assignment) of a UL signal (UL data signal, UL control signal, DMRS, PTRS, for example).

In scheduling, scheduler 101 selects, from "Configuration type 1" and "Configuration type 2," a mapping pattern configuration indicating resource elements on which the DMRS in the DL signal is mapped. For example, scheduler 101 selects one mapping pattern from Configuration type 1 and Configuration type 2 based on propagation path environments (e.g., communication quality and frequency selectivity) and/or requirements (moving speed of a supported terminal, for example) and/or the performance of radio base station 10 or user terminal 20. Alternatively, a single mapping pattern may be predetermined.

Scheduler 101 may be understood as an example of a controller that controls in a way as described later, based on a reference position in the time domain of the DL signal, a position at which the PTRS is to be mapped in the time domain of the DL signal. Non-limitative examples of the "reference position" in the time domain include a position corresponding to a symbol in which the DMRS is arranged, a position corresponding to the leading symbol within each slot (or mini slot), a position corresponding to the leading symbol of a data channel, for example, as described later.

Scheduler 101 outputs scheduling information to transmission signal generator 102 and mapper 104.

Moreover, scheduler 101 configures a Modulation and Coding Scheme (MCS) (such as a coding rate, modulation scheme, for example) of the DL data signal and the UL data signal based on the channel quality between radio base station 10 and user terminal 20, for example. Scheduler 101 outputs the information on the configured MCS to transmission signal generator 102 and coding and modulation section 103. The MCS configuration is not limited to the case where radio base station 10 configures the MCS, but user terminal 20 may configure the MCS. In the case where user terminal 20 configures the MCS, radio base station 10 would be satisfied by merely receiving the MCS information from user terminal 20 (not illustrated).

Transmission signal generator 102 generates a transmission signal (including DL data signal and DL control signal). For example, the DL control signal includes DCI containing the scheduling information (e.g., configuration information) or the MCS information output by scheduler 101. Transmission signal generator 102 outputs the generated transmission signal to coding and modulation section 103.

Based on the MCS information input from scheduler 101, for example, coding and modulation section 103 performs coding processing and modulation processing on the transmission signal input from transmission signal generator 102. Coding and modulation section 103 outputs the modulated transmission signal to mapper 104.

Mapper 104 maps the transmission signal input from coding and modulation section 103 on radio resources (DL resources) based on the scheduling information (e.g., DL resource allocation) input from scheduler 101. Mapper 104 also maps the DMRS and/or PTRS on the radio resources (DL resources) based on the scheduling information. Mapper 104 outputs, to transmitter 105, the DL signal mapped on the radio resources.

Transmitter 105 performs transmission processing, such as upconversion, amplification on the DL signal input from mapper 104, and transmits a radio frequency signal (DL signal) from antenna 106.

Receiver 107 performs reception processing, such as amplification, downconversion on a radio frequency signal (UL signal) received by antenna 106, and outputs the UL signal to controller 108. The UL signal may include a UL data signal, DMRS, and/or PTRS.

Based on the scheduling information (e.g., UL resource allocation information) input from scheduler 101, controller 108 separates (demaps) the UL data signal and the DMRS and/or PTRS from the UL signal input from receiver 107. Then, controller 108 outputs the UL data signal to demodulation and decoding section 110, and outputs the DMRS and/or PTRS to channel estimator 109.

Channel estimator 109 performs channel estimation using the DMRS of the UL signal, and outputs, to demodulation and decoding section 110, a channel estimation value as an estimation result. Channel estimator 109 performs the channel estimation, for example, using the PTRS of the UL signal and computes a difference among the channel estimation values of symbols, so as to compute a phase fluctuation amount of each symbol and output the phase fluctuation amount to demodulation and decoding section 110.

Demodulation and decoding section 110 performs demodulation and decoding processing on the UL data signal input from controller 108 based on the channel estimation value or based on the channel estimation values and the phase fluctuation amount input from channel estimator 109. For example, demodulation and decoding section 110 corrects, using the amount of time variation among the symbols of Resource Elements (REs) on which the UL data signal to be demodulated is mapped, the channel estimation values of the subcarriers of the REs. Then, demodulation and decoding section 110 performs channel compensation (equalization processing) on the demodulation target signal, for example, by multiplying the demodulation target signal by the reciprocals of the corrected channel estimation values, so as to demodulate the UL data signal after channel compensation. In addition, demodulation and decoding section 110 transfers the demodulated and decoded UL data signal to an application section (not illustrated). The application section performs processing such as that related to a higher layer of the physical layer or the MAC layer.

A block including scheduler 101, transmission signal generator 102, coding and modulation section 103, mapper 104, and transmitter 105 may be understood as an example of a radio transmission device included in radio base station 10. A block including receiver 107, controller 108, channel estimator 109, and demodulation and decoding section 110 may be understood as an example of a radio reception device included in radio base station 10.

Moreover, a block including controller 108, channel estimator 109, and demodulation and decoding section 110 may be understood as an example of a processor that performs reception processing on a DL signal using a PTRS mapped in the time domain based on a reference position in the time domain of the DL signal as described later.

<User Terminal>

FIG. 2 is a block diagram illustrating an example of entire configuration of user terminal 20 according to the embodiment. User terminal 20 includes antenna 201, receiver 202, controller 203, channel estimator 204, demodulation and decoding section 205, transmission signal generator 206, coding and modulation section 207, mapper 208, and transmitter 209.

Receiver 202 performs reception processing, such as amplification, downconversion on a radio frequency signal (DL signal) received by antenna 201, and outputs the DL signal to controller 203. The DL signal may include a DL data signal, DMRS, and/or PTRS.

Controller 203 separates (demaps) a DL control signal and the DMRS and/or PTRS from the DL signal input from receiver 202. Then, controller 203 outputs the DL control signal to demodulation and decoding section 205, and outputs the DMRS and/or PTRS to channel estimator 204.

Controller 203 controls the reception processing on the DL signal. In addition, controller 203 separates (demaps) the DL data signal from the DL signal, and outputs the DL data signal to demodulation and decoding section 205 based on the scheduling information (e.g., resource allocation DL information) input from demodulation and decoding section 205.

Channel estimator 204 performs channel estimation using the DMRS separated from the DL signal, and outputs, to demodulation and decoding section 205, a channel estimation value as an estimation result. Channel estimator 204 performs the channel estimation, for example, using the PTRS of the DL signal and computes a difference among the channel estimation values of symbols, so as to compute a phase fluctuation amount of each symbol and output the phase fluctuation amount to demodulation and decoding section 205.

Demodulation and decoding section 205 demodulates the DL control signal input from controller 203. In addition, demodulation and decoding section 205 performs decoding processing (e.g., blind detection processing) on the demodulated DL control signal. Demodulation and decoding section 205 outputs, to controller 203 and mapper 208, the scheduling information (e.g., DL/UL resource allocation information) obtained by demodulation of the DL control signal and addressed to the corresponding user terminal 20, and outputs MCS information of the DL data signal to coding and modulation section 207.

Based on the MCS information of the DL data signal included in the DL control signal input from controller 203, demodulation and decoding section 205 performs demodulation and decoding processing on the DL data signal input from controller 203 using the channel estimation value or using the channel estimation values and the phase fluctuation amount input from channel estimator 204.

For example, demodulation and decoding section 205 corrects, using the amount of time variation among symbols of REs on which the DL data signal to be demodulated is mapped, the channel estimation values of subcarriers of the REs. Then, demodulation and decoding section 205 performs channel compensation (equalization processing) on the demodulation target signal, for example, by multiplying the demodulation target signal by the reciprocals of the corrected channel estimation values, so as to demodulate the DL data signal after channel compensation.

In addition, demodulation and decoding section 205 transfers the demodulated and decoded DL data signal to an application section (not illustrated). The application section performs processing such as that related to a higher layer of the physical layer or the MAC layer.

Transmission signal generator 206 generates a transmission signal (including a UL data signal or UL control signal), and outputs the generated transmission signal to coding and modulation section 207.

Based on the MCS information input from demodulation and decoding section 205, for example, coding and modulation section 207 performs coding processing and modulation processing on the transmission signal input from transmission signal generator 206. Coding and modulation section 207 outputs the modulated transmission signal to mapper 208.

Mapper 208 maps the transmission signal input from coding and modulation section 207 on radio resources (UL resources) based on the scheduling information (UL resource allocation) input from demodulation and decoding section 205. Mapper 208 also maps the DMRS and/or PTRS on the radio resources (UL resources) based on the scheduling information.

The mapping of the DMRS and/or PTRS on the radio resources may be controlled by controller 203, for example. For example, controller 203 may be understood as an example of a controller that controls in a way as described later, based on a reference position in the time domain of the UL signal, the position at which the PTRS is to be mapped in the time domain of the UL signal.

Transmitter 209 performs transmission processing, such as upconversion, amplification on the UL signal (including at least the UL data signal and DMRS) input from mapper 208, and transmits a radio frequency signal (UL signal) from antenna 201.

A block including transmission signal generator 206, coding and modulation section 207, mapper 208, and transmitter 209 may be understood as an example of a radio transmission device included in user terminal 20. A block including receiver 202, controller 203, channel estimator 204, and demodulation and decoding section 205 may be understood as an example of a radio reception device included in user terminal 20.

In the radio communication system including radio base station 10 and user terminal 20 as described above, a front-loaded DMRS may be used as an example of the DMRS. The front-loaded DMRS is arranged forward in the time direction in a resource unit that is a unit of resource allocation (or in a subframe). With the front-loaded DMRS, it is possible to reduce processing time taken for the channel estimation and demodulation processing in the radio communication system.

For example, two mapping patterns are specified as mapping patterns of the front-loaded DMRS. Hereinafter, the descriptions of the two mapping patterns will be given. The front-loaded DMRS may hereinafter be referred to as "FL-DMRS" or simply as "DMRS."

<First Mapping Patterns (Configuration Type 1)>

Figure 3:
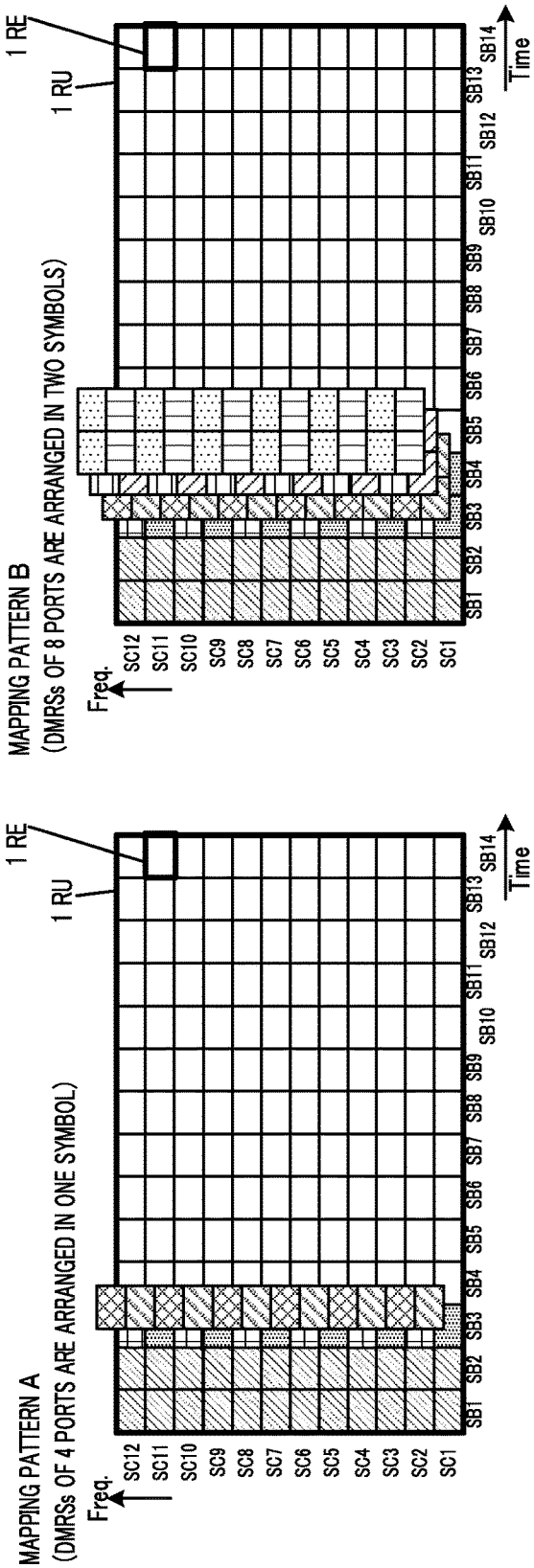
FIG. 3 illustrates DMRS first mapping pattern examples in one embodiment.

FIG. 3 illustrates first mapping pattern examples in the embodiment. FIG. 3 illustrates mapping patterns of front-loaded DMRSs of from Port #0 to Port #7. The first mapping patterns in FIG. 3 include mapping pattern A in which the DMRS(s) of one port to four ports is arranged in one symbol, and mapping pattern B in which the DMRS(s) of one port to eight ports is arranged in two symbols.

Each of the mapping patterns illustrates the mapping position of DMRS of each port within the resource unit (RU) (also called a resource block, resource block pair, for example) which is a resource allocation unit.

The RU is configured with 168 Resource Elements (REs) arranged in 14 columns in the time direction and in 12 rows in the frequency direction), for example. One RE is a radio resource region defined by one symbol and one subcarrier. That is, one RU is configured by 14 symbols and 12 subcarriers.

The RU may also be referred to as a "slot." The "slot" may be divided into "mini slots" in the time direction. Each "mini slot" may be configured with the number of symbols in a range of 1 to 13 symbols, for example.

14 symbols in the time direction in one slot may be described as SB1 to SB14 sequentially from the left in the following description. In addition, 12 subcarriers in the frequency direction in one slot may be described as SC1 to SC12 sequentially from the bottom.

The control signal channel (e.g., PDCCH) is arranged on the REs in two leading symbols (that is, SB1 and SB2) in one slot. The number of symbols for the control signal channel is not limited to two. Note also that, the positions of DMRSs to be mapped may not be limited to the third and the fourth symbols (SB3 and SB4), and may also be the fourth and the fifth symbols (SB4 and SB5). For example, in the UL, the DMRS may be arranged in the leading one of symbols to which the PUSCH is mapped.

Mapping pattern A supports one port up to four ports. Mapping pattern B supports one port up to eight ports. The first mapping patterns are Interleaved Frequency Division Multiplexing (IFDM)-based, and include a configuration in which the DMRS frequency-direction insertion density (the arrangement interval and the number of DMRSs in the frequency direction) per one layer is comparatively high. In the first mapping patterns, the DMRSs of the same port are arranged at intervals of one subcarrier. This arrangement may be called "Comb2" or IFDM (RPF=2).

In the first mapping patterns, Code Division Multiplexing (CDM) in the frequency direction is applied to multiplex port #0 and port #1 and to multiplex port #2 and port #3. For example, an Orthogonal Cover Code (OCC) (which may also be referred to as Cyclic Shift (CS) in the present patterns) is used in the CDM in the frequency direction. For example, the set of {+1, +1} is used as the OCC for port #0 and port #2, and the set of {+1, −1} is used as OCC for port #1 and #3. Hereinafter, the CDM in the frequency direction in which the OCC is used is referred to as Frequency Domain Orthogonal Cover Code (FD-OCC).

In mapping pattern B of the first mapping patterns, the CDM in the time direction is applied to multiplex the set of port #0 and port #1 and the set of port #4 and port #6. Similarly, the CDM in the time direction is applied to multiplex the set of port #2 and port #3 and the set of port #5 and port #7. The OCC is used in the CDM in the time direction, for example. Hereinafter, the CDM in the time direction in which the OCC is used is referred to as Time Domain Orthogonal Cover Code (TD-OCC).

The indices of ports #4 or above in FIG. 3 (that is, from port #4 to port #7) are an example, and the present invention is not limited to these indices. For example, the correspondence between the arrangement of DMRS of each port and the port index in FIG. 3 may be changed appropriately.

<Second Mapping Patterns (Configuration Type 2)>

Figure 4:
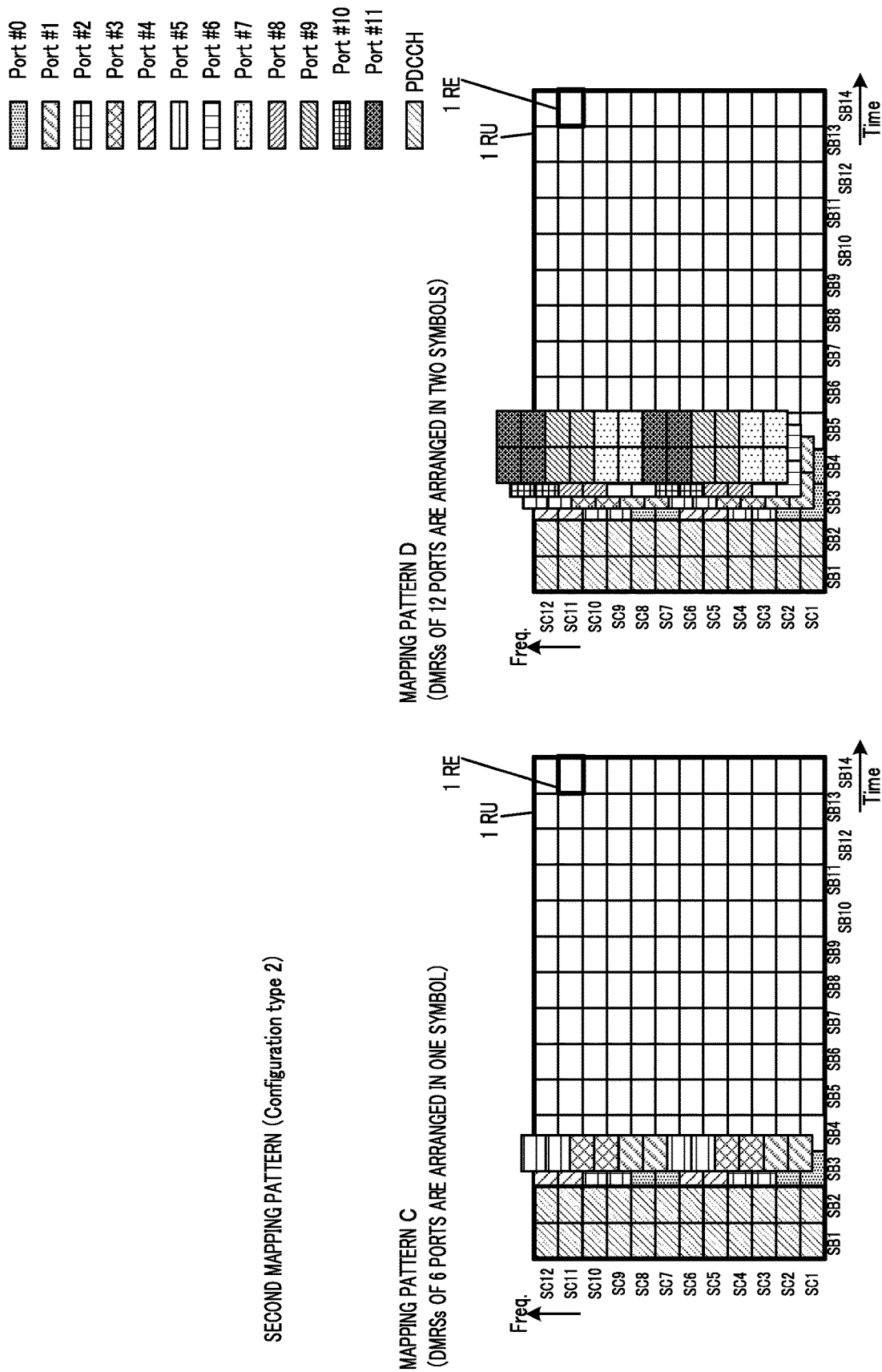
FIG. 4 illustrates DMRS second mapping pattern examples in one embodiment.

FIG. 4 illustrates second mapping pattern examples in the embodiment. FIG. 4 illustrates mapping patterns of DMRSs of from Port #0 to Port #11. The second mapping patterns in FIG. 4 include mapping pattern C in which the DMRS(s) of one port to six ports is arranged in one symbol, and mapping pattern D in which the DMRS(s) of one port to twelve ports is arranged in two symbols.

The control signal channel (e.g., PDCCH) is arranged on the REs in two leading symbols (that is, SB1 and SB2) in one slot. The number of symbols for the control signal channel is not limited to two. Note also that, the positions of DMRSs to be mapped may not be limited to the third and the fourth symbols, and may also be the fourth and the fifth symbols (SB4 and SB5). For example, in the UL, the DMRS may be arranged in the leading one of symbols to which the PUSCH is mapped.

Mapping pattern C supports one port up to six ports. Mapping pattern D supports one port up to 12 ports.

In the second mapping patterns, the CDM in the frequency direction (e.g., FD-OCC (which may also be called CS)) is applied to multiplex port #0 and port #1, to multiplex port #2 and port #3, and to multiplex port #4 and port #5. For example, the set of {+1, +1} is used as the OCC for ports #0, #2, and #4, and the set of {+1, −1} is used as OCC for ports #1, #3, and #5.

In mapping pattern D of the second mapping patterns, the CDM in the time direction (e.g., TD-OCC) is applied to multiplex the set of port #0 and port #1 and the set of port #6 and port #7. Similarly, the CDM in the time direction is applied to multiplex the set of port #2 and port #3 and the set of port #8 and port #9, and to multiplex the set of port #4 and port #5 and the set of port #10 and port #11.

The indices of ports #6 or above in FIG. 4 (that is, from port #6 to port #11) are an example, and the present invention is not limited to these indices. For example, the correspondence between the arrangement of DMRS of each port and the port index in FIG. 4 may be changed appropriately.

The DMRS of each port specified in the first and the second mapping patterns as described above is arranged in the slot by applying various arrangement methods.

Mapping patterns A to D for DMRS as described above are examples, and the present invention is not limited to these examples.

Mapping the PTRS in any one of the mapping patterns for DMRS including mapping patterns A to D has been studied. The PTRS is used for correcting phase fluctuations in the propagation channel of the DL and/or UL signal. The "correction" of the phase fluctuations may be interchangeable with "amendment" or "compensation."

Here, the effect of phase noise on the DL and/or UL signal may be different depending on carrier frequencies and/or modulation schemes. For example, there is a tendency that the higher the carrier frequency and/or the higher the order of modulation scheme, the greater the effect of phase noise.

For this reason, it is considered, for example, that the PTRSs are arranged (or, "mapped" or "inserted") more densely in the time direction when the carrier frequency is higher and/or the order of modulation scheme is higher.

Figure 5A:
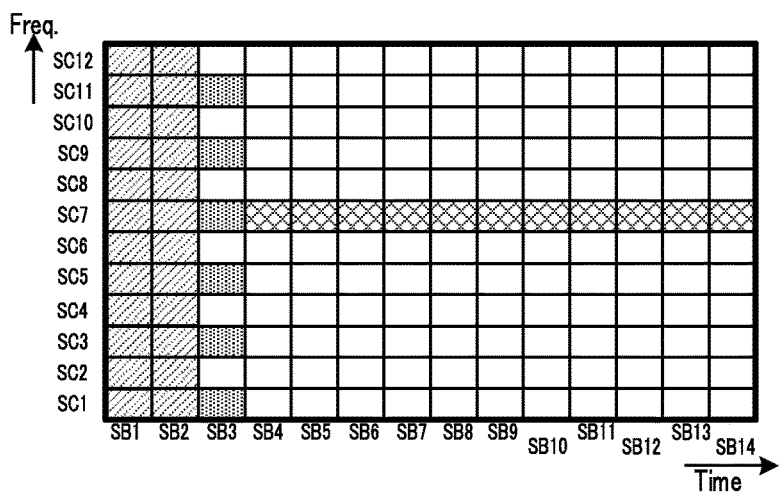
FIGS. 5A to 5C illustrate arrangement examples of a PTRS.
Figure 5B:
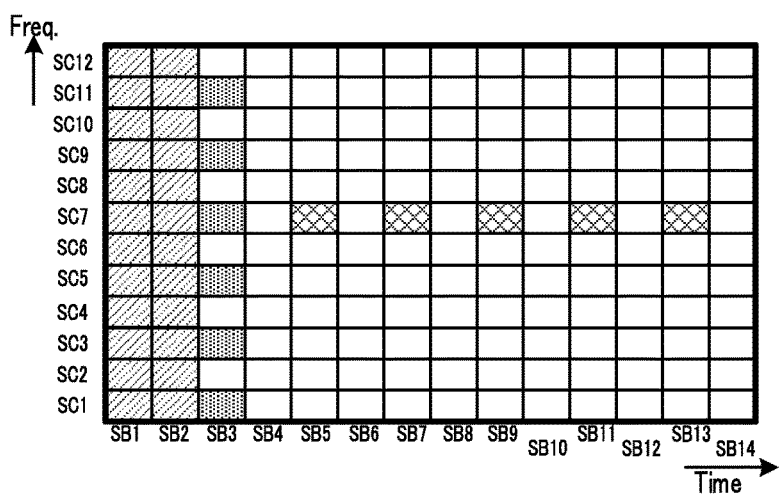
Figure 5C:
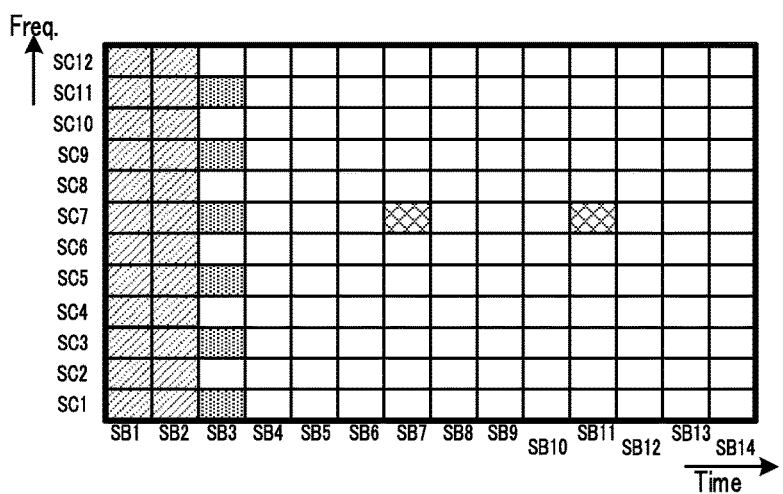

For example, support for a pattern illustrated in FIG. 5A in which a plurality of PTRSs are arranged in the time direction without any interval therebetween and for patterns illustrated in FIGS. 5B and 5C in which the PTRSs are arranged in the time direction with intervals of one or more symbols is considered.

As for the density of PTRSs inserted in the time direction (this density may be referred to as "insertion density") in the examples illustrated in FIGS. 5A to 5C, the density in FIG. 5A is higher than that in FIG. 5B, the density in FIG. 5B is higher than that in FIG. 5C. In other words, support for various patterns may be considered with respect to the PTRS arrangement interval (or PTRS insertion density) in the time direction.

Although the PTRSs are arranged in the time direction at SC7 in the examples of FIGS. 5A to 5C, this is merely for illustration purpose in every respect, and the PTRSs may be arranged in the time direction at one or more of 12 subcarriers SC1 to SC12 (the same applies in the following description).

Although the DMRS arrangement positions in the examples of FIGS. 5A to 5C correspond, for example, to the arrangement positions of DMRSs of port #0 in mapping pattern A of FIG. 3, this is merely for illustration purpose in every respect. The DMRS arrangement positions may be arrangement positions of DMRSs of any port as specified in one of mapping patterns A to D, or may be a pattern different from mapping patterns A to D (the same applies in the following description).

(Outline of PTRS Arrangement)

The PTRS may be mapped at an arrangement position determined based on an arrangement method predetermined in the signal transmitting side and the signal receiving side.

For example, it may be in radio base station 10 as a DL signal transmitter that the PTRS arrangement position with respect to the DL signal is determined based on the predetermined arrangement method and the PTRS is mapped to the determined arrangement position. It may, for example, be in user terminal 20 as a UL signal transmitter that the PTRS arrangement position with respect to the UL signal is determined based on the predetermined arrangement method and the PTRS is mapped to the determined arrangement position.

User terminal 20 corresponding to a reception side of the DL-signal performs the reception processing on the DL signal based on an assumption that the PTRS is arranged at the arrangement position which is determined based on the predetermined arrangement method. Radio base station 10 corresponding to a reception side of the UL-signal performs the reception processing on the UL signal based on an assumption that the PTRS is arranged at the arrangement position which is determined based on the predetermined arrangement method.

Since the PTRS arrangement is determined based on the predetermined arrangement method, implicit PTRS mapping can be achieved, for example. Consequently, it is possible to prevent an increase in signaling overhead while achieving the PTRS mapping.

Either the signal transmitting side or the signal receiving side may determine the PTRS arrangement position and notify the other one of them of the information on the arrangement position.

For example, radio base station 10 may determine the PTRS arrangement position in one or both of the DL signal and UL signal, and notify user terminal 20 of the information on the arrangement position. User terminal 20 identifies the PTRS arrangement position based on the notified information, and performs the reception processing on the DL signal or the PTRS mapping to the UL signal.

For example, user terminal 20 which is the UL-signal transmitting side may determine the PTRS arrangement position in the UL signal, and notify radio base station 10 of the information on the arrangement position. Radio base station 10 identifies the PTRS arrangement position based on the notified information, and performs the reception processing on the UL signal.

Notification of the information on the PTRS arrangement position makes it possible to flexibly change the PTRS arrangement position as appropriate.

Hereinafter, descriptions will be given of the PTRS arrangement method with reference to FIGS. 6 to 26 (the "arrangement method" may be interchangeable with the other terms such as "arrangement pattern" and "arrangement rule").

(First Examples of PTRS Arrangement Method)

Figure 6:
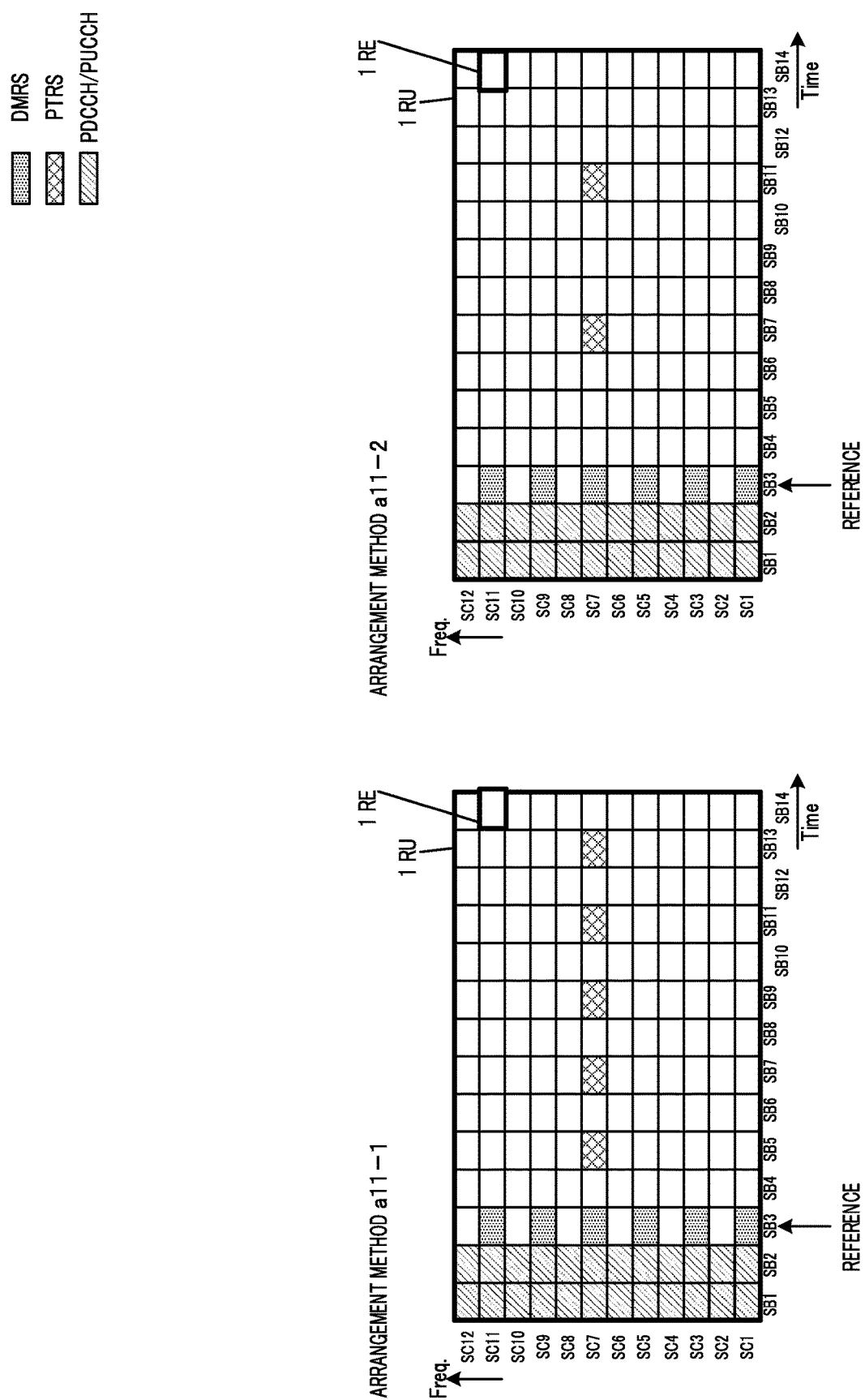
FIG. 6 illustrates first examples of a PTRS arrangement method according to one embodiment.

FIG. 6 illustrates first examples of the PTRS arrangement method according to one embodiment. PTRS arrangement methods a11-1 and a11-2 illustrated in FIG. 6 are examples in which PTRS arrangement is configured based on the arrangement position of FL-DMRS.

In the examples of FIG. 6, the signal of the control channel (e.g., PDCCH or PUCCH) is arranged in the leading two symbols (SB1 and SB2), and the FL-DMRS is arranged in the third symbol (SB3) in one slot.

In arrangement method a11-1, the PTRSs are arranged every two symbols with reference to SB3 that is arranged with the FL-DMRS. For example, the PTRSs are arranged in SB5, SB7, SB9, SB11, and SB13.

Meanwhile, arrangement method a11-2 is an example in which the PTRS insertion density in one slot is lower than in arrangement method a11-1. For example, in arrangement method a11-2, the PTRSs are arranged every four symbols in one slot with reference to SB3 that is arranged with the FL-DMRS. For example, the PTRSs are arranged in SB7 and SB11.

In the examples of FIG. 6, a signal of a data channel (e.g., PDSCH or PUSCH) may be arranged on REs to which none of the control channel, FL-DMRS, and PTRS is mapped. The same is applied to the figures used for the below-mentioned descriptions.

(Second Examples of PTRS Arrangement Method)

Figure 7:
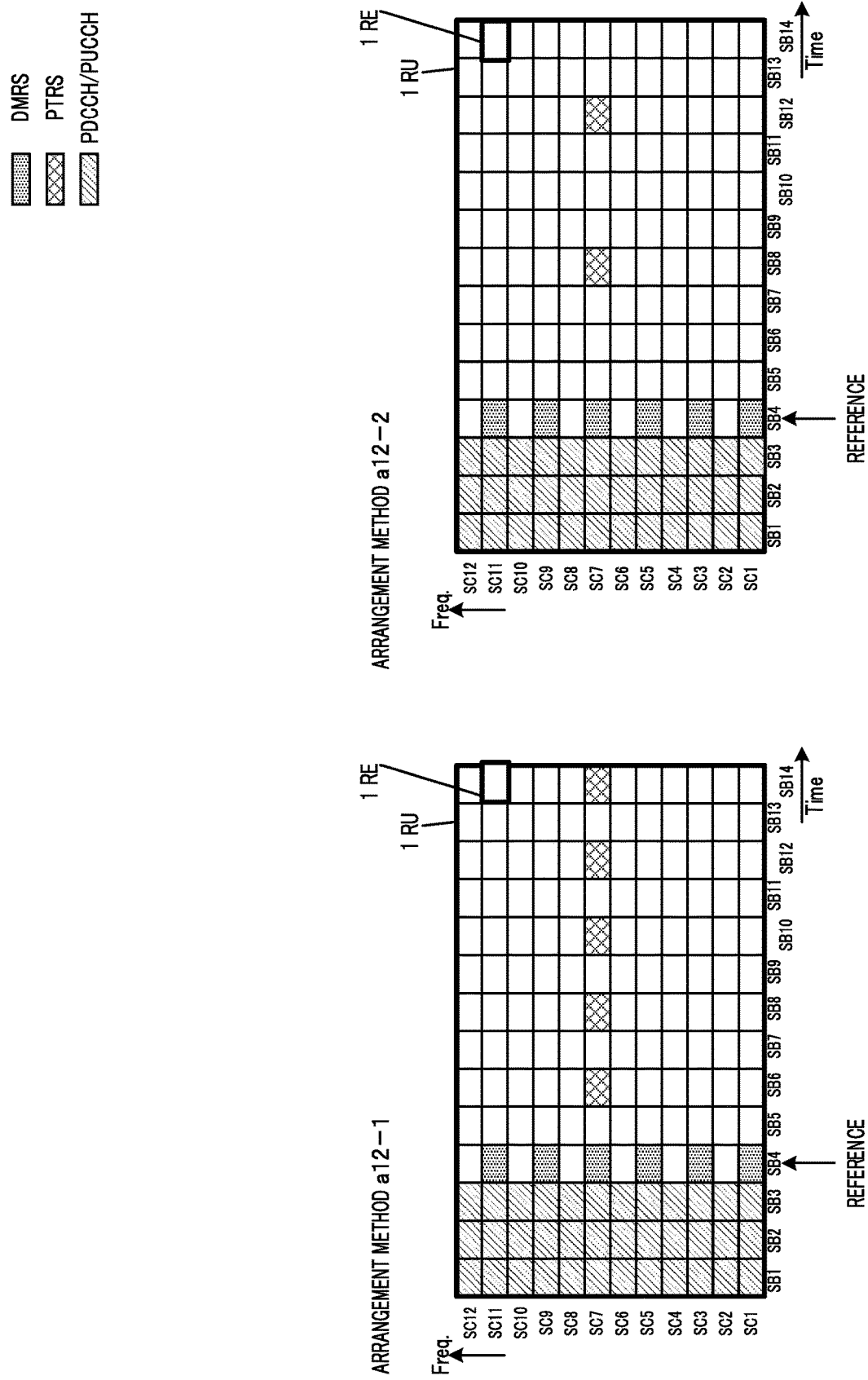
FIG. 7 illustrates second examples of the PTRS arrangement method according to one embodiment.

FIG. 7 illustrates second examples of the PTRS arrangement method according to one embodiment. PTRS arrangement methods a12-1 and a12-2 illustrated in FIG. 7 are examples in which the signal of the control channel (e.g., PDCCH or PUCCH) is arranged in the leading three symbols (SB1 to SB3), and the FL-DMRS is arranged in the fourth symbol (SB4) in one slot.

In arrangement method a12-1, the PTRSs are arranged every two symbols with reference to SB4 that is arranged with the FL-DMRS. For example, the PTRSs are arranged in SB6, SB8, SB10, SB12, and SB14.

Meanwhile, arrangement method a12-2 is an example in which the PTRS insertion density in one slot is lower than in arrangement method a12-1. For example, in arrangement method a12-2, the PTRSs are arranged every four symbols in one slot with reference to SB4 that is arranged with the FL-DMRS. For example, the PTRSs are arranged in SB8 and SB12.

According to the PTRS arrangement methods illustrated in FIGS. 6 and 7, the PTRSs can be mapped at a required interval in consideration of both of the FL-DMRS used for channel estimation and/or phase fluctuation correction of a channel estimation value, and of the PTRS used for the phase fluctuation correction of the channel estimation value. When the DMRS port and the PTRS port are associated with each other, the same precoding is applied to the DMRS port and the PTRS port associated with each other. Therefore, the PTRS arrangement effective for the channel estimation and phase fluctuation correction of the channel estimation value can be achieved, and signal quality degradation can be prevented.

Arrangement method a11-1, arrangement method a11-2, and other arrangement methods may be applied selectively for one or more slots as a unit.

(Third Example of PTRS Arrangement Method)

Figure 8:
FIG. 8 illustrates a third example of the PTRS arrangement method according to one embodiment.
Figure 8:
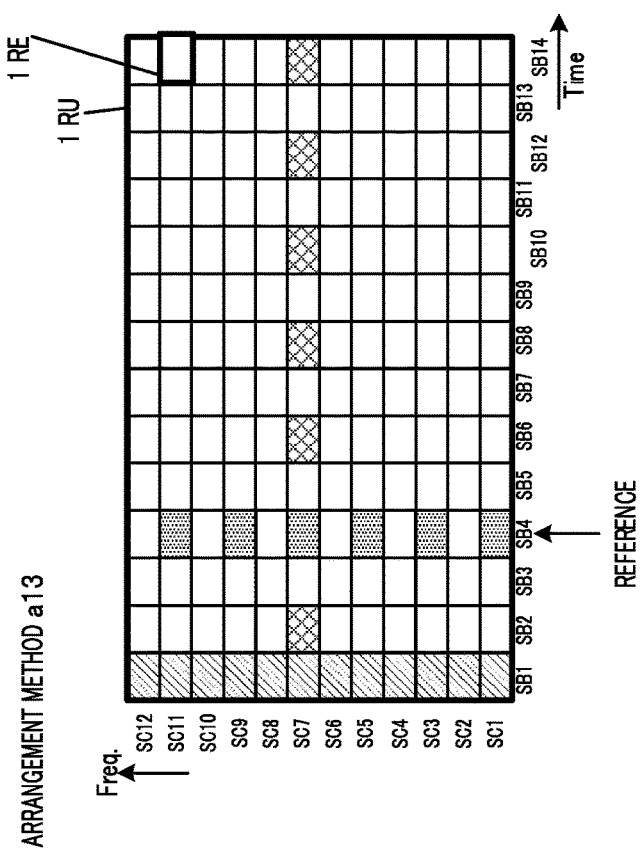

FIG. 8 illustrates a third example of the PTRS arrangement method according to one embodiment. PTRS arrangement method a13 illustrated in FIG. 8 is an example in which in one slot the signal of the control channel (e.g., PDCCH or PUCCH) is arranged in the leading symbol (SB1), the FL-DMRS is arranged in the fourth symbol (SB4), and the data signal (PDSCH or PUSCH) is arranged on the resources of from the second to the fourteenth symbols in which neither the FL-DMRS nor the PTRS is arranged.

In arrangement method a13, the PTRS may be arranged to precede the FL-DMRS. The arrangement region may be limited to the data signal or does not have to be limited to the data signal. For example, as illustrated in FIG. 8, the PTRSs may be arranged every two symbols in both of the forward and backward directions in the time domain with reference to SB4 that is arranged with the FL-DMRS.

For example, the PTRSs may be arranged in SB2 that is the front of SB4 arranged with the FL-DMRS, and arranged in SB6, SB8, SB10, SB12, and SB14 that are the back of SB4.

According to arrangement method a13, the phase fluctuation can be corrected based on the PTRS not only for the data signal arranged in the back of the FL-DMRS but also for the data signal arranged in the front of the FL-DMRS.

(Fourth Examples of PTRS Arrangement Method)

Figure 9:
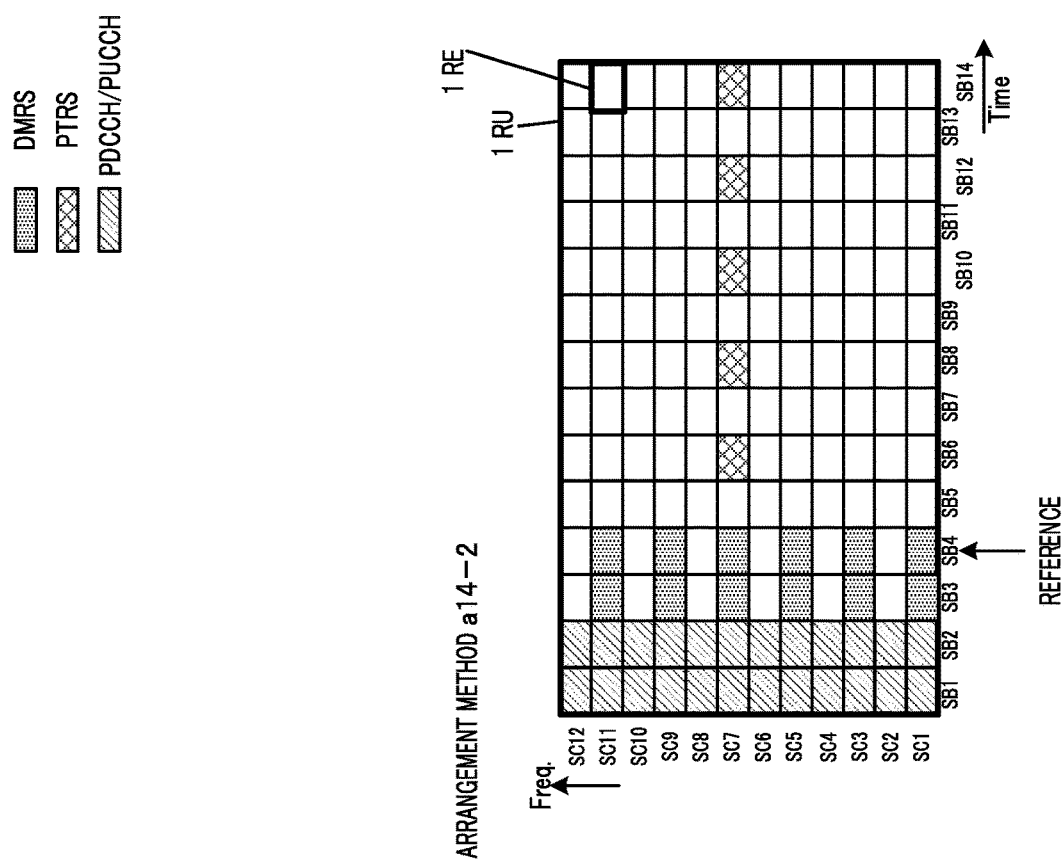
FIG. 9 illustrates fourth examples of the PTRS arrangement method according to one embodiment.
Figure 9:
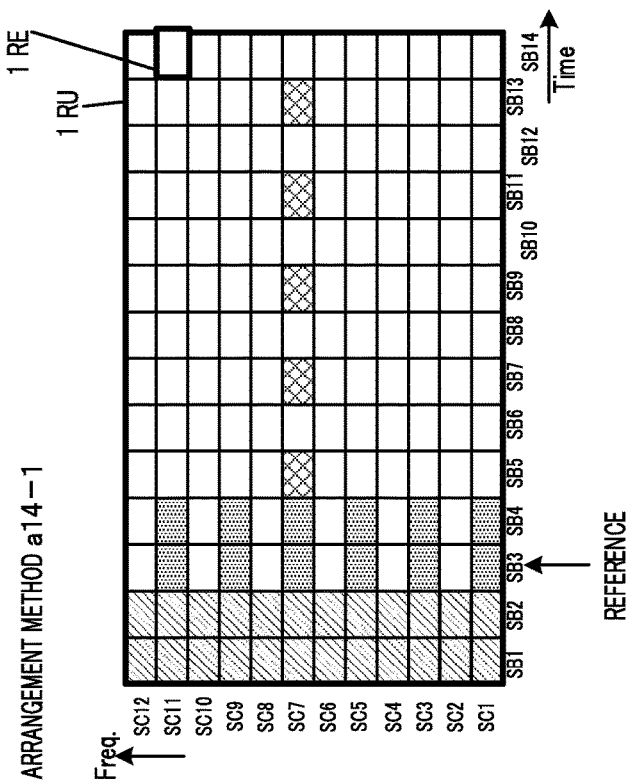

FIG. 9 illustrates fourth examples of the PTRS arrangement method according to one embodiment. PTRS arrangement methods a14-1 and a14-2 illustrated in FIG. 9 are examples in which the FL-DMRS is arranged over two symbols.

By way of a non-limiting example, the signal of the control channel (e.g., PDCCH or PUCCH) may be arranged in the leading two symbols (SB1 and SB2), and the FL- DMRSs may be arranged in the third symbol (SB3) and the fourth symbol (SB4) in one slot.

In the case where the FL-DMRS is arranged over two symbols as in this example, the PTRSs may be arranged with reference to any of the two symbols of FL-DMRS. For example, in arrangement method a14-1, the PTRSs are arranged every two symbols with reference to the FL-DMRS arranged in the front (arranged in SB3). Meanwhile, in arrangement method a14-2, the PTRSs are arranged every two symbols with reference to the FL-DMRS arranged in the backward (arranged in SB4).

In arrangement method a14-1, the PTRSs can be mapped at a required interval irrespective of whether or not a plurality of DMRS ports are multiplexed by using TD-OCC (in other words, irrespective of whether or not one channel estimation value is obtained based on the DMRSs in a plurality of symbols).

Meanwhile, in arrangement method a14-2, when repetition of the DMRS of a single DMRS port is carried out over a plurality of symbols, a channel estimation value is obtained based on each of the DMRSs in the plurality of symbols (e.g., DMRSs in SB3 and SB4). In this case, since the channel estimation value can be obtained in SB4, the arrangement reference may be shifted in the backward in the time direction. Correspondingly, the PTRS arrangement position can also be shifted backward in the time direction. Thus, depending on the DMRS arrangement position and/or the PTRS arrangement interval, the PTRSs can be mapped at a required interval without increase in PTRS overhead being caused.

(Fifth Example of PTRS Arrangement Method)

Figure 10:
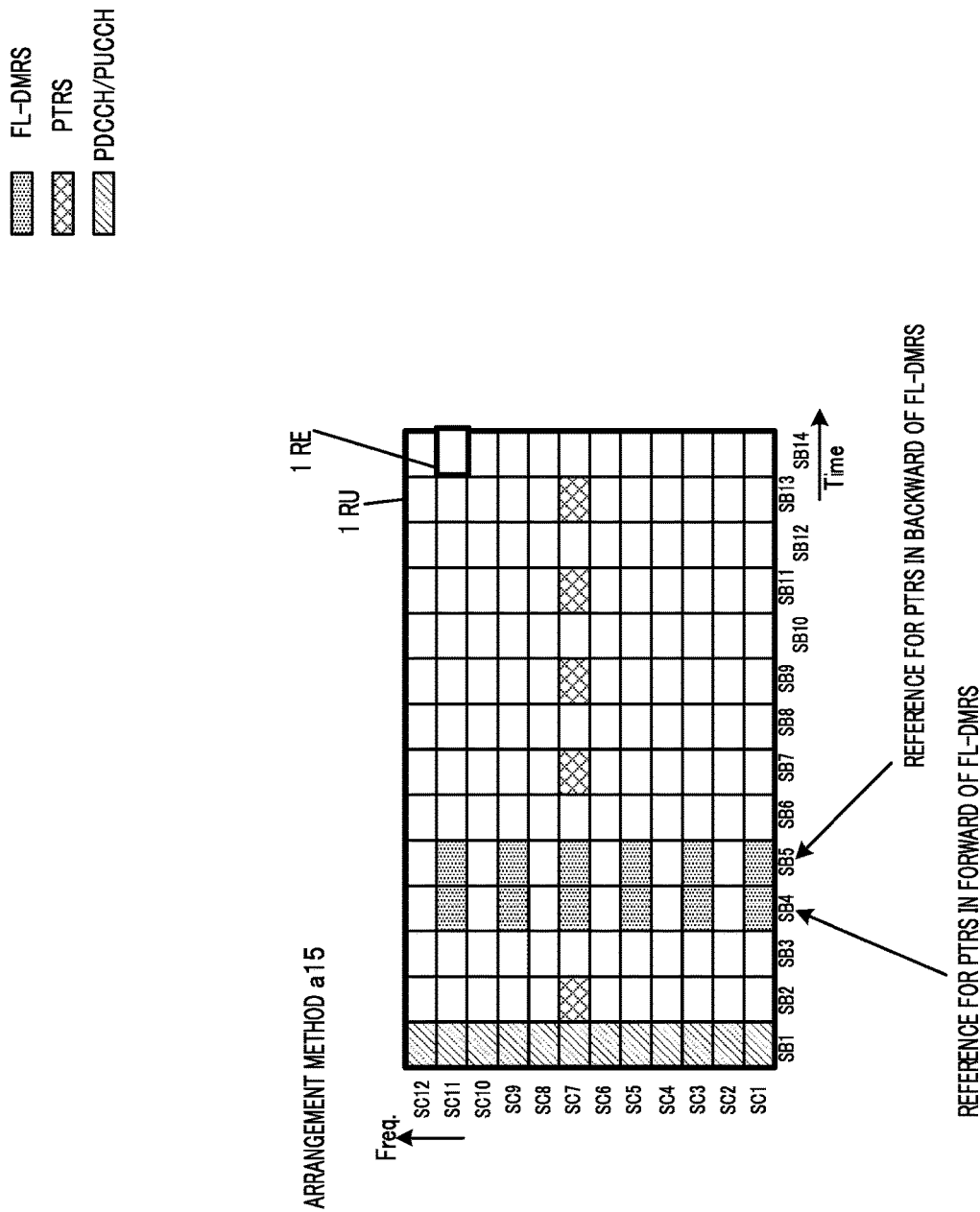
FIG. 10 illustrates a fifth example of the PTRS arrangement method according to one embodiment.

FIG. 10 illustrates a fifth example of the PTRS arrangement method according to one embodiment. PTRS arrangement method a15 illustrated in FIG. 10 is an example in which the FL-DMRS is arranged over two symbols as in FIG. 9. However, while the FL-DMRS is arranged in SB3 and SB4 in the example of FIG. 9, the FL-DMRS is arranged in SB4 and SB5 in the example of FIG. 10.

In arrangement method a15, SB4 which is the front one of SB4 and SB5 arranged with the FL-DMRS may be used for the arrangement reference for the PTRS to be arranged in the front of the FL-DMRS. SB5 which is the back one of SB4 and SB5 arranged with the FL-DMRS may be used for the arrangement reference for the PTRSs to be arranged in the backward of the FL-DMRS. The PTRSs are arranged every two symbols in the example of FIG. 10.

According to arrangement method a15, the PTRSs can be mapped at a required interval in both of the forward and backward directions from the FL-DMRS.

(Sixth Examples of PTRS Arrangement Method)

Figure 11:
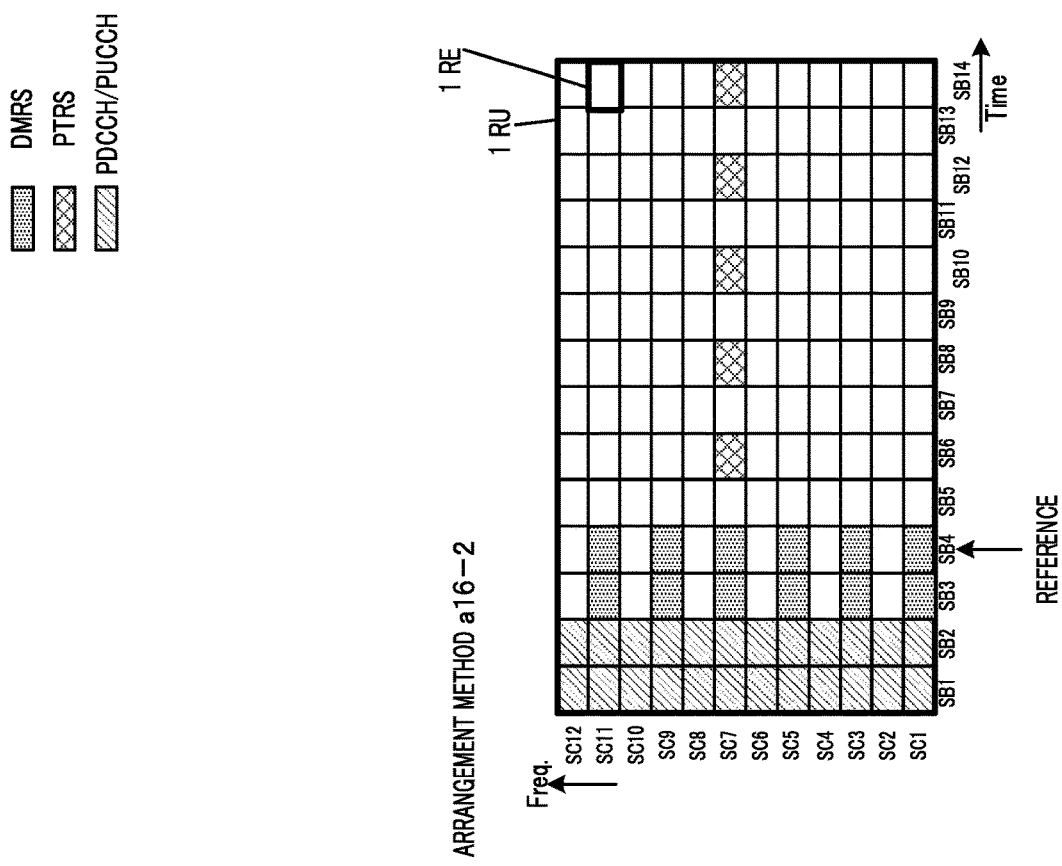
FIG. 11 illustrates sixth examples of the PTRS arrangement method according to one embodiment.
Figure 11:
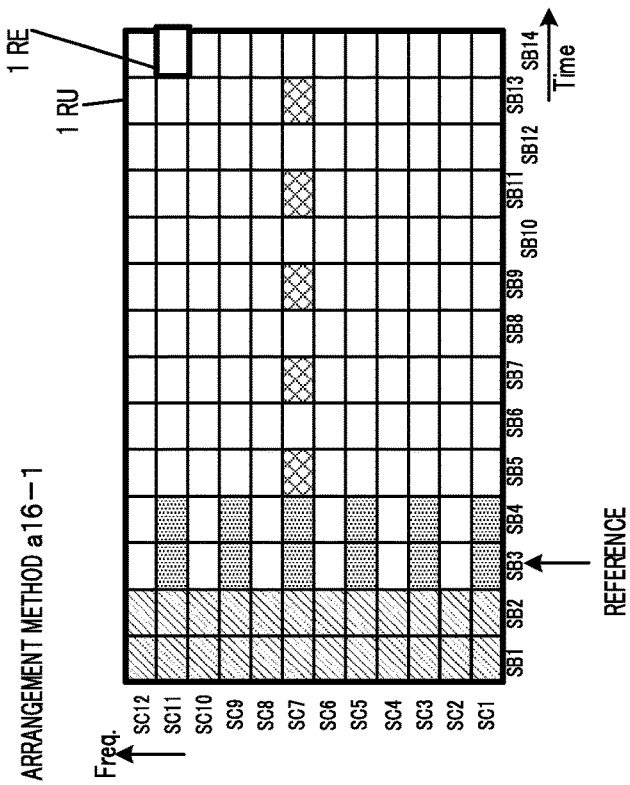

FIG. 11 illustrates sixth examples of the PTRS arrangement method according to one embodiment. The arrangement examples of FIG. 9 are presented again in FIG. 11. The arrangement examples of FIG. 9 are presented again in FIG. 11 for convenience in order to describe an operational example from the viewpoint of the receiving side (e.g., user terminal 20) in contrast to the case where FIG. 9 is understood as the arrangement examples focusing on the transmitting side (e.g., radio base station 10).

Therefore, arrangement methods a16-1 and a16-2 illustrated in FIG. 11 are identical to arrangement methods a14-1 and a14-2 illustrated in FIG. 9, respectively.

For example, in arrangement method a16-1, the PTRSs may be arranged every two symbols with reference to the FL-DMRS arranged in the front (arranged in SB3). Meanwhile, in arrangement method a16-2, the PTRSs may be arranged every two symbols with reference to the FL-DMRS arranged in the backward (arranged in SB4).

From the viewpoint of user terminal 20, in a case where DMRSs of a plurality of DMRS ports are multiplexed using TD-OCC, the PTRS arrangement position may be identified in arrangement method a16-1 with reference to SB3 that is the front one of SB3 and SB4 arranged with the DMRSs. From the viewpoint of user terminal 20, the case where the DMRSs of a plurality of DMRS ports are multiplexed using TD-OCC corresponds to the case where the DMRS ports assigned to user terminal 20 are port #0 and port #4 in mapping pattern A of FIG. 3.

In contrast, in a case where the repetition of a DMRS of a single port is carried out over a plurality of symbols, the PTRS arrangement position may be identified in arrangement method a16-2 with reference to SB4 that is the back one of SB3 and SB4 arranged with the DMRSs.

As described above, the PTRSs can be mapped at a suitable interval depending on the DMRS multiplexing method.

(Seventh Examples of PTRS Arrangement Method)

Figure 12:
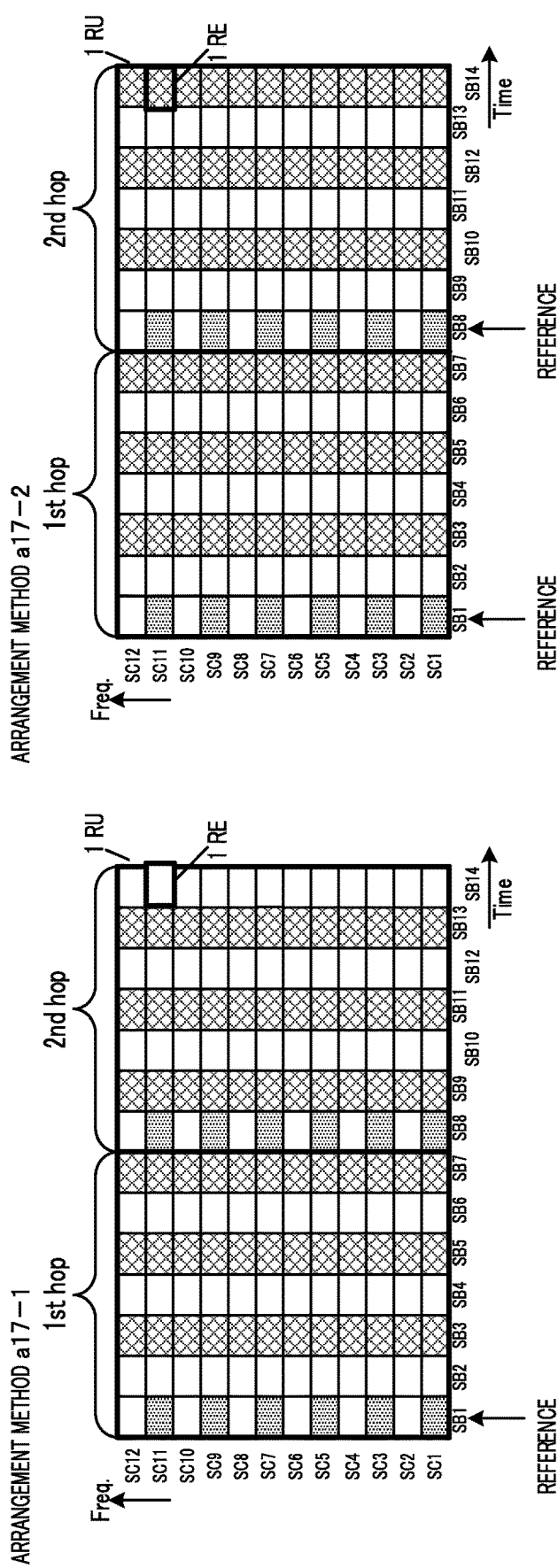
FIG. 12 illustrates seventh examples of the PTRS arrangement method according to one embodiment.

FIG. 12 illustrates seventh examples of the PTRS arrangement method according to one embodiment. FIG. 12 illustrates arrangement methods (a17-1 and a17-2) for a case where frequency hopping is applied for UL DFT-S-OFDM.

For example, a slot may be divided into a 1st hop region (from SB1 to SB7) and a 2nd hop region (from SB8 to SB14) in the time direction as illustrated in FIG. 12. The 1st and the 2nd hop regions are illustrated in FIG. 12 with the same frequency resources (SC1 to SC12) for convenience of illustration. Frequency resources different between the 1st and the 2nd hop regions may be assigned to one user terminal 20 by the frequency hopping.

The PTRS illustrated in FIG. 12 does not denote that the PTRS alone is arranged for each RE, but denotes a symbol including an PTRS. The detailed description will be given later.

In the examples of FIG. 12, the DMRSs are arranged in the first symbol (SB1) and the eighth symbol (SB8). In other words, the DMRSs are arranged in the respective first symbols (SB1 and SB8) of the 1st and the 2nd hop regions. Such DMRSs may be an FL-DMRS or additional DMRS (A-DMRSs), or may simply be a DMRS. The PTRSs are arranged every two symbols.

In arrangement method a17-1, the PTRSs may be arranged in both of the 1st and the 2nd hop regions with reference to the DMRS (SB1) arranged in the 1st hop region. In other words, the PTRS arranged in the 2nd hop region may be arranged with reference to the position of DMRS arranged in the 1st hop region.

For example, in the case where the PTRSs are arranged every two symbols, the PTRSs are arranged in SB3, SB5, and SB7 in the 1st hop region, and in SB9, SB11, and SB13 in the 2nd hop region.

Meanwhile, in arrangement method a17-2, the PTRS is arranged in each of the hop regions with reference to the position of the DMRS arranged in each of the 1st and the 2nd hop regions.

For example, the PTRS in the 1st hop region may be arranged with reference to the position (e.g., SB1) of the DMRS arranged in the 1st hop region, and the PTRS in the 2nd hop region may be arranged with reference to the position (e.g., SB8) of the DMRS arranged in the 2nd hop region.

For example, in the case where the PTRSs are arranged every two symbols, the PTRSs are arranged in SB3, SB5, and SB7 in the 1st hop region, and in SB10, SB12, and SB14 in the 2nd hop region.

According to arrangement method a17-1, it is possible to map the PTRSs using a single indicator independent to the position of the DMRS arranged in the 2nd hop region.

Meanwhile, according to arrangement method a17-2, it is possible to achieve suitable PTRS mapping in which the DMRS arrangement position for each of the 1st and the 2nd hop regions is taken into consideration.

The PTRS arranged in the UL signal in the case of DFT-S-OFDM may be understood as a DFT-S-OFDM symbol in which the PTRS is included. The phrase "PTRS is included" is intended to mean that a signal (e.g., PUSCH) other than the PTRS may be included in the same symbol, regardless of whether this inclusion is "Pre-DFT insertion" or "Post-DFT insertion."

In the "Pre-DFT insertion," since the PTRS insertion is preformed before DFT processing, for example, one symbol is formed by performing the DFT and of OFDM modulation on the PTRS and one or both of a data signal and a signal of another channel collectively.

Meanwhile, in the "Post-DFT insertion," the PTRS insertion is performed separately, for example, after the DFT processing on one or both of the data signal and the signal of another channel. Accordingly, the PTRS and one or both of the data signal and the signal of another channel are frequency-multiplexed within one symbol. Alternatively, one or both of the data signal and the signal of another channel is not multiplexed and the PTRS is inserted.

In other words, the phrase "PTRS is included" means that one or both of the data signal and the signal of another channel may be multiplexed with the PTRS. The same is applied to the following descriptions.

In addition, the number of hop regions is not limited to two. It is possible that three or more hop regions are configured in the time direction. When three or more hop regions are configured, the DMRS arranged in the leading hop region may be used for an arrangement reference for the PTRS arrangement in one or more of backward hop regions. Alternatively, the PTRSs in the 2nd and subsequent hop regions may be arranged with reference to the DMRS arranged in the hop region preceding the 2nd and subsequent hop regions. Alternatively, the PTRSs may be arranged in the individual hop regions with reference to the DMRSs arranged in the individual hop regions. The hop regions are not limited to those in each of which an equal number of symbols are included. For example, in the case where the number of hop regions is two, there may be 10 symbols in the leading hop and four symbols in the second hop.

(Eighth Examples of PTRS Arrangement Method)

Figure 13:
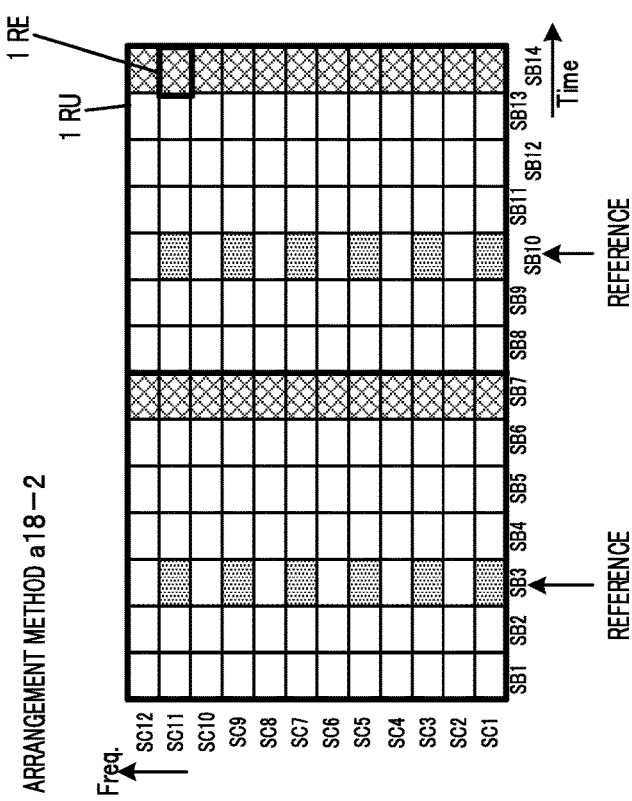
FIG. 13 illustrates eighth examples of the PTRS arrangement method according to one embodiment.
Figure 13:
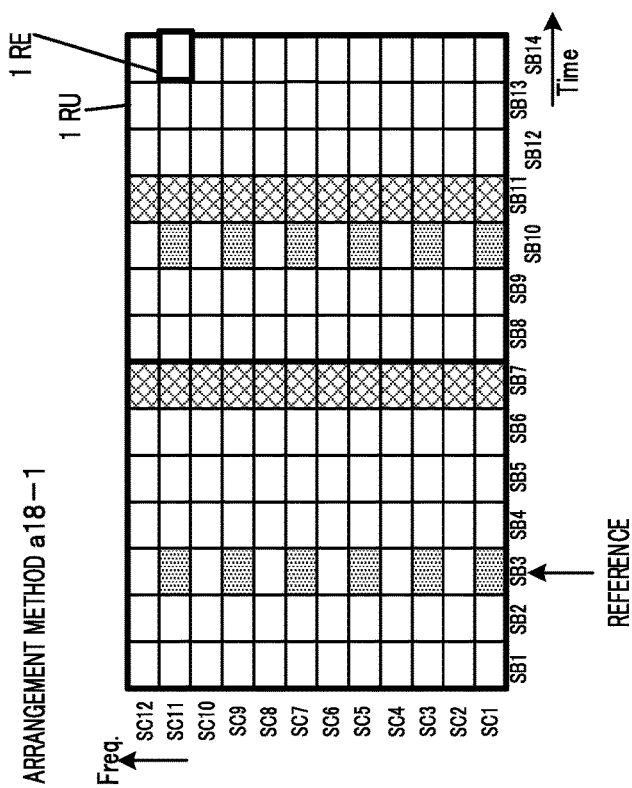

FIG. 13 illustrates eighth examples of the PTRS arrangement method according to one embodiment. The examples in FIG. 13 may be understood as modifications of the examples of FIG. 12 illustrating the case where frequency hopping is applied for UL DFT-S-OFDM.

In the examples (arrangement methods a18-1 and a18-2) of FIG. 13, the FL-DMRSs are arranged in the third symbol (SB3) and the tenth symbol (SB10). In other words, the DMRSs are arranged in the backward of the respective leading symbols of the 1st and the 2nd hop regions. The DMRSs may be an FL-DMRS or A-DMRS, or may simply be a DMRS. Moreover, while the PTRSs are arranged every two symbols in the examples of FIG. 12, the PTRSs are arranged every four symbols in the example of FIG. 13.

In arrangement method a18-1 as in arrangement method a17-1, the PTRSs may be arranged in both of the 1st and the 2nd hop regions with reference to the DMRS (SB3) arranged in the 1st hop region. In other words, the PTRS arranged in the 2nd hop region may be arranged with reference to the position of DMRS arranged in the 1st hop region.

For example, in the case where the PTRSs are arranged every four symbols, the PTRSs are arranged in SB7 in the 1st hop region, and in SB11 in the 2nd hop region.

Meanwhile, in arrangement method a18-2 as in arrangement method a17-2, the PTRS is arranged in each of the hop regions with reference to the position of DMRS arranged in each of the 1st and the 2nd hop regions.

For example, the PTRS in the 1st hop region may be arranged with reference to the position (e.g., SB3) of the DMRS arranged in the 1st hop region, and the PTRS in the 2nd hop region may be arranged with reference to the position (e.g., SB10) of the DMRS arranged in the 2nd hop region.

For example, in the case where the PTRSs are arranged every four symbols, the PTRSs are arranged in SB7 in the 1st hop region, and in SB14 in the 2nd hop region.

According to arrangement method a18-1, it is possible to map the PTRSs using a single indicator independent to the position of the DMRS arranged in the 2nd hop region.

Meanwhile, according to arrangement method a18-2, it is possible to achieve suitable PTRS mapping in which the DMRS arrangement position in each hop is taken into consideration for each of the 1st and the 2nd hop regions.

The number of hop regions is not limited to two also in the examples of FIG. 13. It is possible that three or more hop regions are configured in the time direction. When three or more hop regions are configured, the DMRS arranged in the leading hop region may be used for an arrangement reference for the PTRS in one or more of backward hop regions. Alternatively, the PTRSs in the 2nd and subsequent hop regions may be arranged with reference to the DMRS arranged in the hop region in the front of the 2nd and subsequent hop regions. Alternatively, the PTRSs may be arranged in the individual hop regions with reference to the DMRSs arranged in the individual hop regions. The hop regions are not limited to those in each of which an equal number of symbols are included. For example, in the case where the number of hop regions is two, there may be 10 symbols in the leading hop and four symbols in the second hop.

The methods in which the FL-DMRS is used for the arrangement reference as described above may also be applied in a case where a UL period and a DL period coexist within one slot (which may be a mini slot, alternatively) (not illustrated). In this case, one or both of a FL-DMRS for DL and FL-DMRS for UL may be used as the arrangement reference.

(Ninth Examples of PTRS Arrangement Method)

Figure 14:
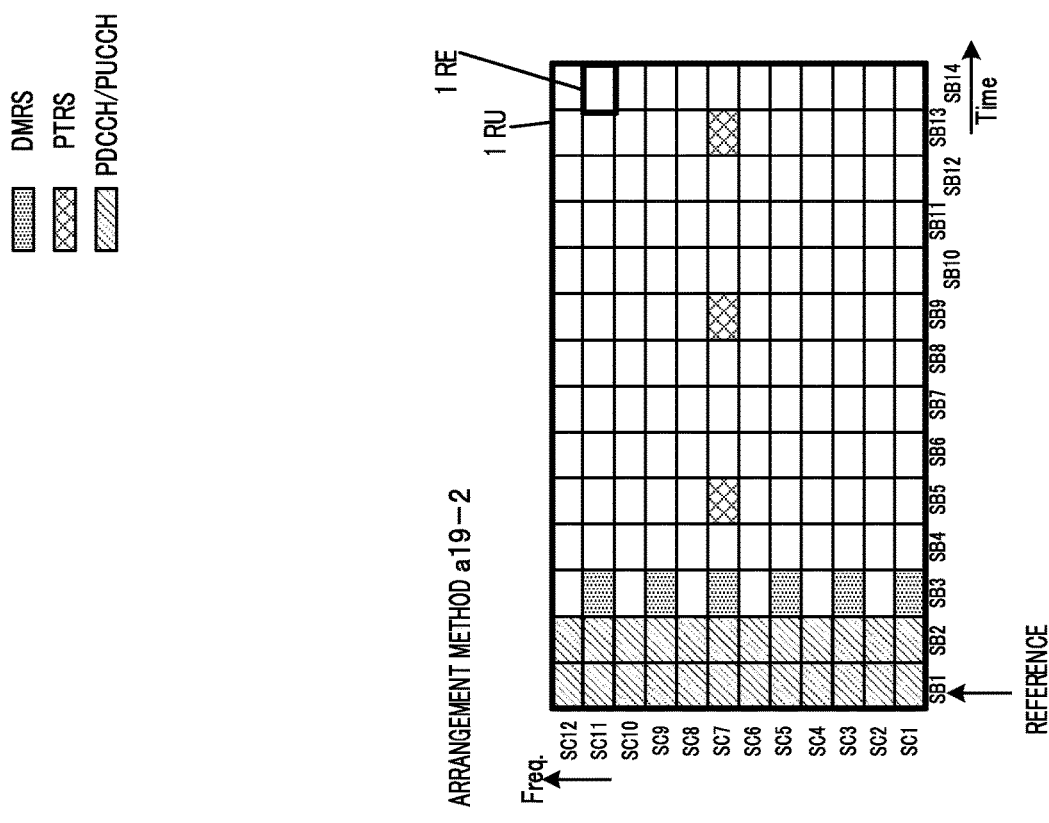
FIG. 14 illustrates ninth examples of the PTRS arrangement method according to one embodiment.
Figure 14:
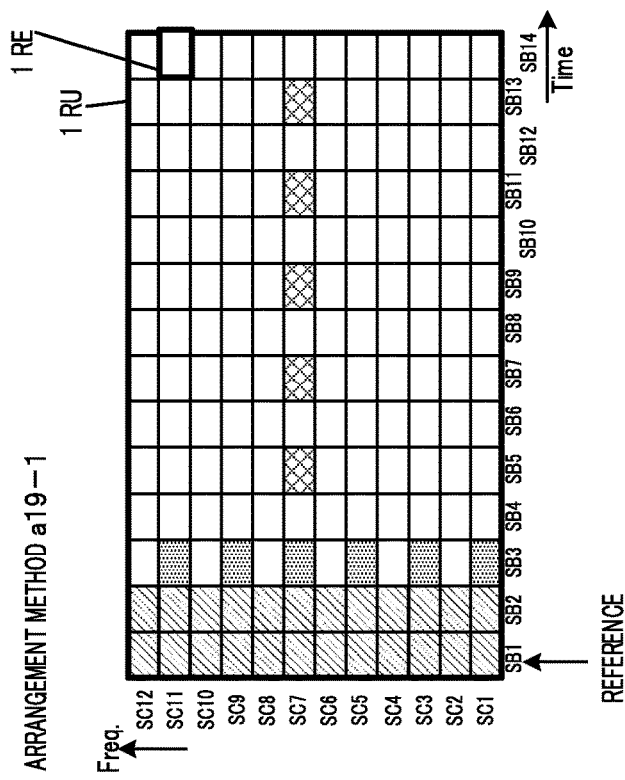

FIG. 14 illustrates ninth examples of the PTRS arrangement method (a19-1 and a19-2), which are examples in which the PTRS is arranged independently of the DMRS arrangement position. In the examples of FIG. 14, the signal of the control channel (e.g., PDCCH or PUCCH) is arranged in the leading two symbols (SB1 and SB2), and the FL-DMRS is arranged in the third symbol (SB3) in one slot (which may be a mini slot, alternatively).

The PTRSs may be arranged, for example, with reference to the leading symbol (SB1) within the slot independently of the FL-DMRS arrangement position (SB3).

For example, the PTRSs are arranged every two symbols with reference to SB1 in arrangement method a19-1. For example, the PTRSs are arranged in SB5, SB7, SB9, SB11, and SB13.

Although the PTRS is to be arranged also in SB3, the DMRS is arranged in SB3 and, accordingly, the PTRS expected to be arranged in SB3 is punctured for avoiding collision with the DMRS in arrangement method a19-1. When the DMRS is not arranged in SB3, the PTRS may be arranged also in SB3.

Meanwhile, the PTRSs are arranged every four symbols with reference to SB1 in arrangement method a19-2. For example, the PTRSs are arranged in SB5, SB9, and SB13.

It is advantageous from the viewpoint of implementation that the PTRS arrangement position is uniquely determined independent to the DMRS arrangement position, DMRS port, association between the DMRS port and a PTRS port in accordance with arrangement methods a19-1 and a19-2.

The PTRS is not arranged in the leading symbol because the signal of the control channel is arranged in the leading symbol used for the arrangement reference for PTRS arrangement in the example of FIG. 14. Meanwhile, the PTRS may be arranged in the leading symbol when the leading symbol is a symbol available to be arranged with the PTRS. In other words, there are some cases where the PTRS is available to be arranged in the symbol used for the arrangement reference for PTRS arrangement, and other cases where the PTRS is unavailable to be arranged in such a symbol (the same is applied to the following descriptions).

(Tenth Example of PTRS Arrangement Method)

Figure 15:
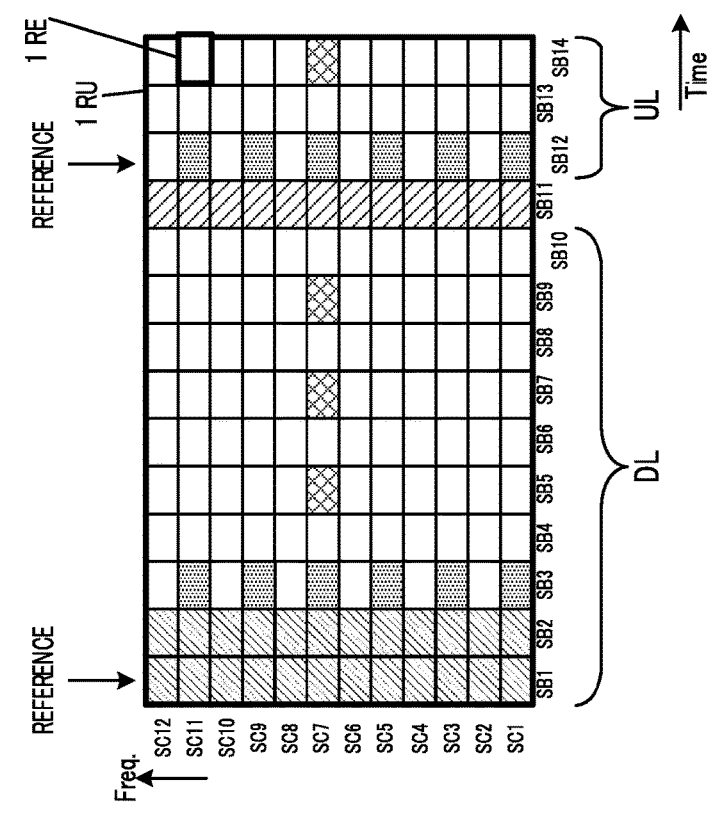
FIG. 15 illustrates a tenth example of the PTRS arrangement method according to one embodiment.

FIG. 15 illustrates a tenth example of the PTRS arrangement method according to one embodiment. FIG. 15 illustrates a arrangement example (PTRS arrangement method a20) for the case where the UL and DL periods coexist within one slot (which may be a mini slot, alternatively).

For example, ten symbols (SB1 to SB10) among 14 symbols (SB1 to SB14) belong to the DL period, and three symbols (SB12 to SB14) among the 14 symbols belong to the UL period. SB11 may be a guard period (guard period) for switching between DL and UL. The signal of the control channel (e.g., PDCCH) is arranged in the leading two symbols (SB1 and SB2) in the DL period.

The DMRSs are arranged in the third symbol (SB3) in the DL period and in the leading symbol (SB12) in the UL period. The DMRS arranged in SB3 may be an FL-DMRS and the DMRS arranged in SB12 may be an FL-DMRS or A-DMRS, or may simply be a DMRS.

In arrangement method a20, the PTRSs may be arranged with reference to the respective starting symbols in the DL and UL periods. For example, in the case where the PTRSs are arranged every two symbols, the PTRSs are arranged in SB5, SB7, and SB9 in the DL period with reference to SB1 that is the starting symbol in the DL period.

The DMRS is arranged in SB3 and, accordingly, the PTRS expected to be arranged in SB3 is punctured, for example, in order to avoid collision with the DMRS in arrangement method a20. When the DMRS is not arranged in SB3, the PTRS may be arranged also in SB3.

It is advantageous from the viewpoint of implementation that the PTRS arrangement position is uniquely determined independent to the DMRS arrangement position, DMRS port, association between the DMRS port and a PTRS port also in arrangement method a20.

The symbols in the DL and UL periods are provided with serial indices (SB1 to SB14) in FIG. 15. For example, although the indices assigned to symbols may be different between in the DL period and in the UL period, this is acceptable as long as symbols corresponding to the starting symbols in the DL period and/or the UL period are used for the arrangement reference for PTRS(s).

The PTRSs may also be arranged with reference to the ending symbols in the DL period and/or the UL period. The PTRS in one of the DL and UL periods may be arranged with reference to the starting symbol or the ending symbol in the other one of the DL and UL periods.

(Eleventh Examples of PTRS Arrangement Method)

Figure 16:
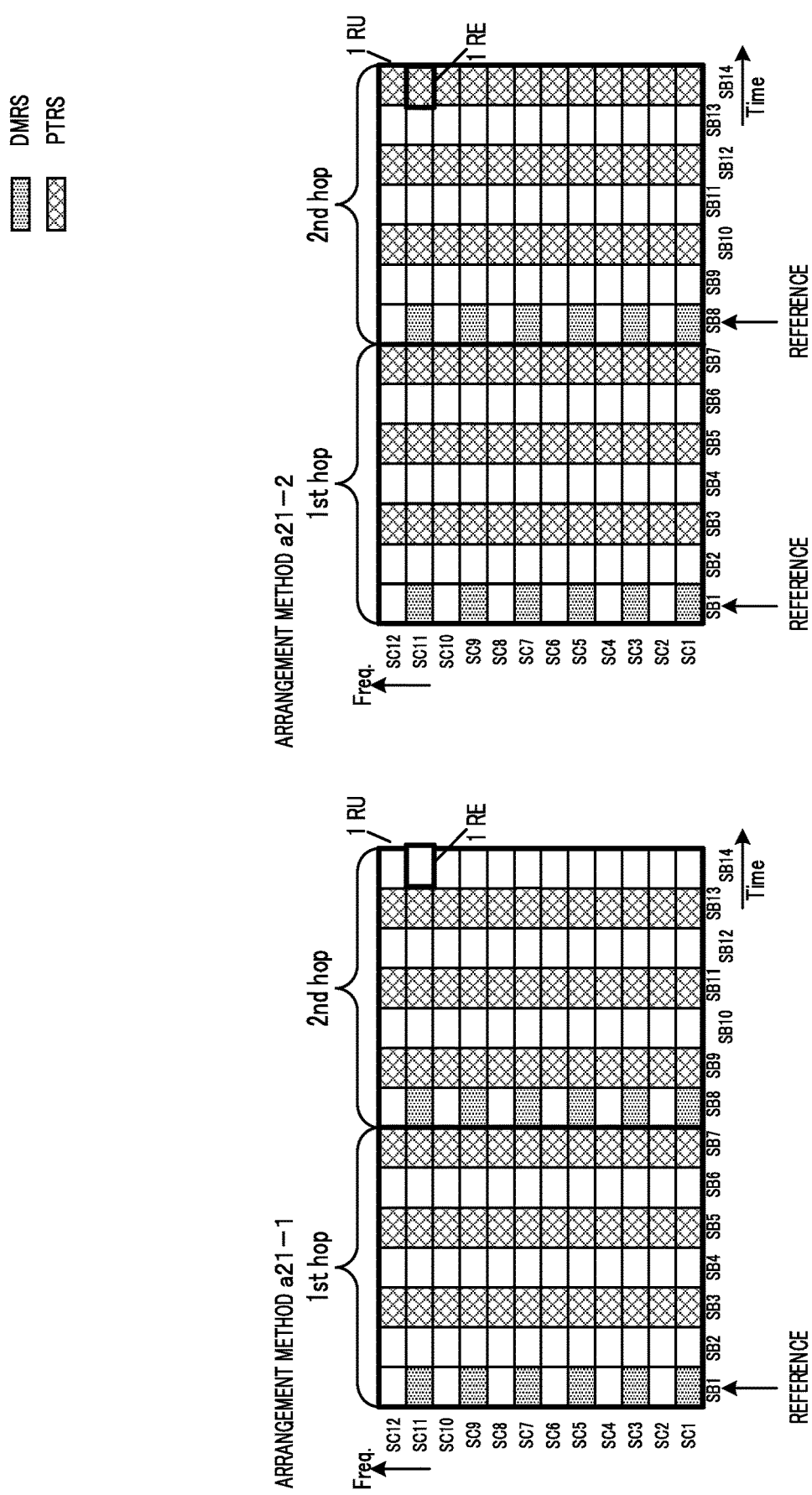
FIG. 16 illustrates eleventh examples of the PTRS arrangement method according to one embodiment.

FIG. 16 illustrates eleventh examples of the PTRS arrangement method according to one embodiment. FIG. 16 illustrates arrangement methods (a21-1 and a21-2) for a case where frequency hopping is applied for UL DFT-S-OFDM. For example, a slot may be divided in the time direction into a 1st hop region and a 2nd hop region as illustrated in FIG. 16. For example, frequency resources different between the 1st and the 2nd hop regions may be assigned to one user terminal 20 by the frequency hopping.

In the examples of FIG. 16, the FL-DMRSs are arranged in the first symbol (SB1) and the eighth symbol (SB8). In other words, the DMRSs are arranged in the respective first symbols (SB1 and SB8) of the 1st and the 2nd hop regions. The PTRSs are arranged every two symbols.

In arrangement method a21-1, the PTRSs may be arranged in both of the 1st and the 2nd hop regions with reference to the leading symbol (SB1) in the 1st hop region. In other words, the PTRS arranged in the 2nd hop region may be arranged with reference to the position of the leading symbol in the 1st hop region.

For example, in the case where the PTRSs are arranged every two symbols, the PTRSs are arranged in SB3, SB5, and SB7 in the 1st hop region, and in SB9, SB11, and SB13 in the 2nd hop region.

Meanwhile, in arrangement method a21-2, the PTRSs are arranged in the 1st and the 2nd hop regions with reference to the leading symbols (SB1 and SB8) of the 1st and the 2nd hop regions, respectively.

For example, the PTRS in the 1st hop region may be arranged with reference to the leading symbol (SB1) in the 1st hop region, and the PTRS in the 2nd hop region may be arranged with reference to the leading symbol (SB8) in the 2nd hop region.

For example, in the case where the PTRSs are arranged every two symbols, the PTRSs are arranged in SB3, SB5, and SB7 in the 1st hop region, and in SB10, SB12, and SB14 in the 2nd hop region.

According to arrangement method a21-1, it is possible to map the PTRSs using a single indicator of the leading symbol in the 1st hop region, which is independent to the leading symbol position in the 2nd hop region. Meanwhile, it is possible to map the PTRSs to the same positions per each of the 1st and the 2nd hop regions according to arrangement method a21-2.

Since FIG. 16 illustrates the examples in which the DMRSs are arranged in the respective leading symbols of the 1st and the 2nd hop regions, the PTRSs seem to be arranged with reference to the DMRSs. However, arrangement methods a21-1 and a21-2 are the examples in which the PTRSs are arranged with reference to the leading symbols in the 1st hop region and/or the 2nd hop region, rather than being arranged with reference to the DMRS arrangement positions.

The number of hop regions is not limited to two also in the examples of FIG. 16. It is possible that three or more hop regions are configured in the time direction. When three or more hop regions are configured, the leading symbol in the leading hop region may be used for an arrangement reference for the PTRS arrangement in one or more succeeding hop regions. Alternatively, the PTRSs in the 2nd and subsequent hop regions may be arranged with reference to the leading symbol in the hop region preceding the 2nd and subsequent hop regions. Alternatively, the PTRSs may be arranged in the individual hop regions with reference to the leading symbols arranged in the individual hop regions. The hop regions are not limited to those in each of which an equal number of symbols are included. For example, in the case where the number of hop regions is two, there may be 10 symbols in the leading hop and four symbols in the second hop.

(Twelfth Examples of PTRS Arrangement Method)

Figure 17:
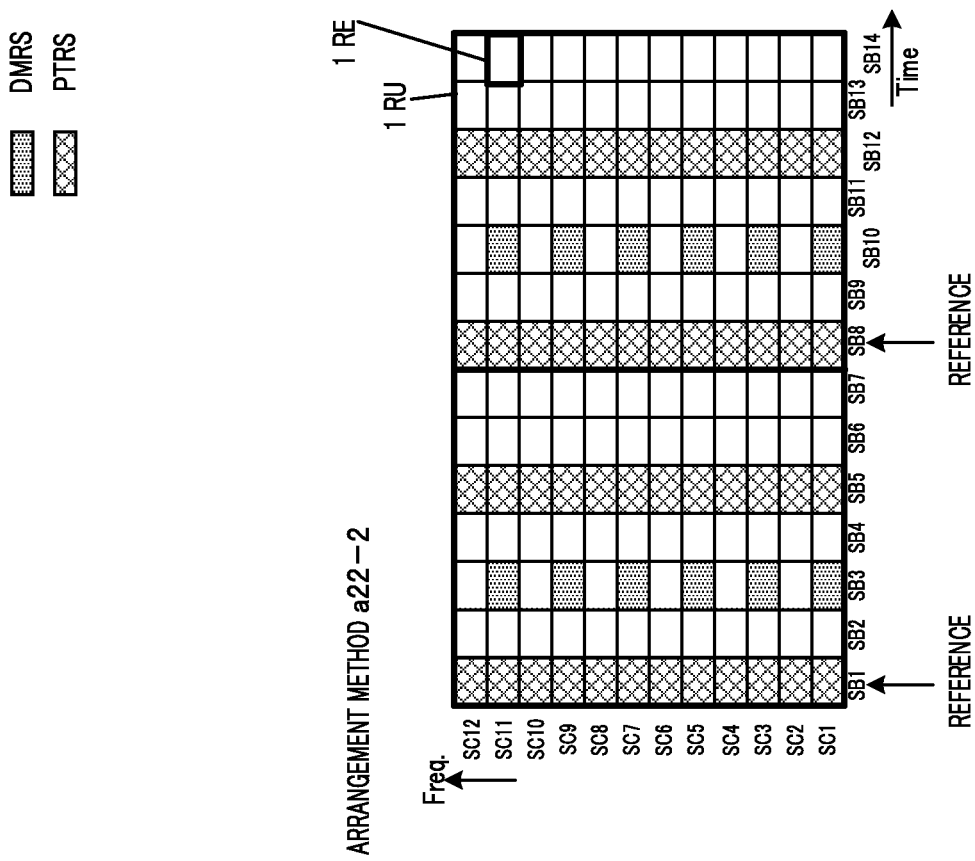
FIG. 17 illustrates twelfth examples of the PTRS arrangement method according to one embodiment.
Figure 17:
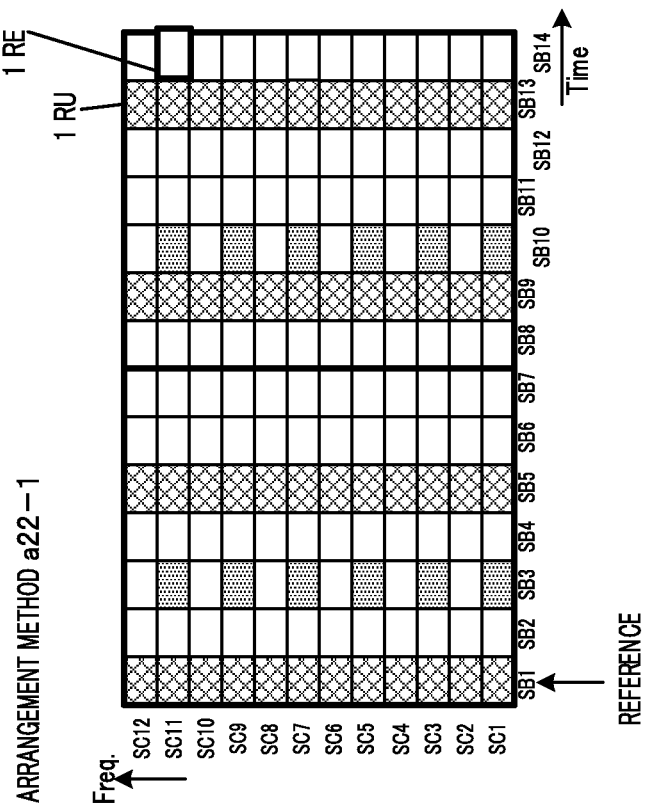

FIG. 17 illustrates twelfth examples of the PTRS arrangement method according to one embodiment. The examples in FIG. 17 may be understood as modifications of the examples FIG. 16 illustrating the case where frequency hopping is applied for UL DFT-S-OFDM.

In the examples (arrangement methods a22-1 and a22-2) of FIG. 17, the DMRSs are arranged in the third symbol (SB3) and the tenth symbol (SB10). In other words, the DMRSs are arranged in the backward of the respective leading symbols in the 1st and the 2nd hop regions. Moreover, while the PTRSs are arranged every two symbols in the examples of FIG. 16, the PTRSs are arranged every four symbols in the examples of FIG. 17.

In arrangement method a22-1 as in arrangement method a21-1, the PTRSs may be arranged in both of the 1st and the 2nd hop regions with reference to the leading symbol (SB1) in the 1st hop region. In other words, the PTRS arranged in the 2nd hop region may be arranged with reference to the leading symbol (SB1) in the 1st hop region.

For example, in the case where the PTRSs are arranged every four symbols, the PTRSs are arranged in SB1 and SB5 in the 1st hop region, and in SB9 and SB13 in the 2nd hop region. Since SB1 used as the reference symbol is a symbol allowing PTRS arrangement therein, the PTRS can be arranged also in SB1.

Meanwhile, in arrangement method a22-2 as in arrangement method a21-2, the PTRS may be arranged in each of the hop regions with reference to the leading symbol of each of the 1st and the 2nd hop regions.

For example, the PTRS in the 1st hop region may be arranged with reference to the leading symbol (SB1) in the 1st hop region, and the PTRS in the 2nd hop region may be arranged with reference to the leading symbol (SB8) in the 2nd hop region.

For example, in the case where the PTRSs are arranged every four symbols, the PTRSs are arranged in SB1 and SB7 in the 1st hop region, and in SB8 and SB12 in the 2nd hop region. Both of SB1 and SB8 used as reference symbols are symbols allowing PTRS arrangement therein.

According to arrangement method a22-1, it is possible to map the PTRSs using a single indicator of the leading symbol in the 1st hop region, which is independent to the leading symbol position in the 2nd hop region. Meanwhile, it is possible to map the PTRSs to the same positions per each of the 1st and the 2nd hop regions according to arrangement method a22-2.

The number of hop regions is not limited to two also in the examples of FIG. 17. It is possible that three or more hop regions are configured in the time direction. When three or more hop regions are configured, the leading symbol in the leading hop region may be used for an arrangement reference for the PTRS arrangement in one or more succeeding hop regions. Alternatively, the PTRSs in the 2nd and subsequent hop regions may be arranged with reference to the leading symbol in the hop region preceding the 2nd and subsequent hop regions. Alternatively, the PTRSs may be arranged in the individual hop regions with reference to the leading symbols arranged in the individual hop regions. The hop regions are not limited to those in each of which an equal number of symbols are included. For example, in the case where the number of hop regions is two, there may be 10 symbols in the leading hop and four symbols in the second hop.

(Thirteenth Examples of PTRS Arrangement Method)

Figure 18:
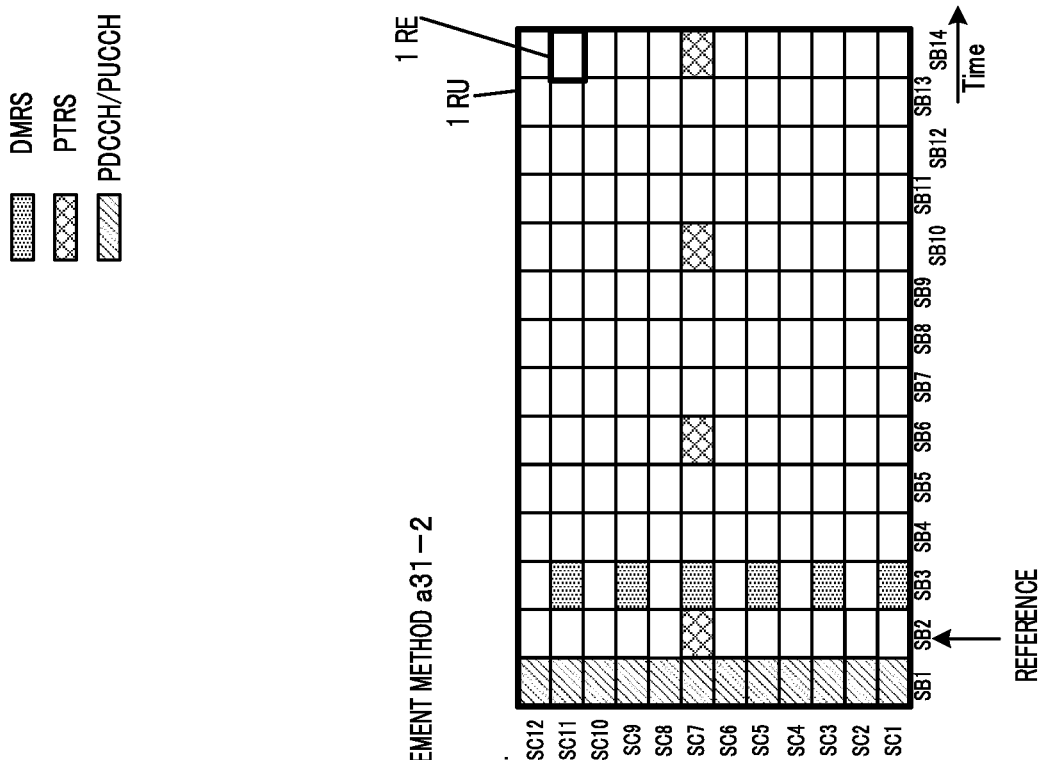
FIG. 18 illustrates thirteenth examples of the PTRS arrangement method according to one embodiment.
Figure 18:
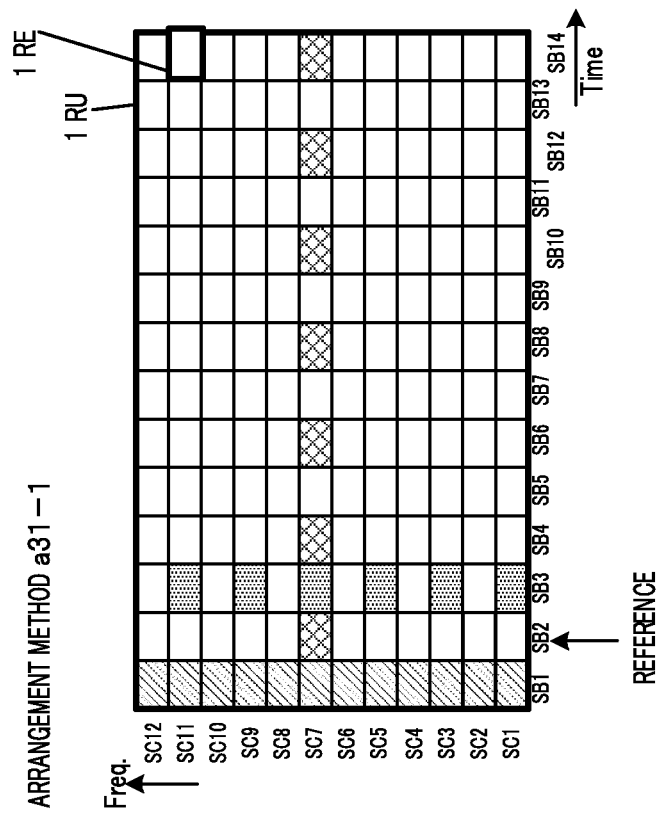

FIG. 18 illustrates thirteenth examples of the PTRS arrangement method according to one embodiment. FIG. 18 illustrates examples (arrangement methods a31-1 and a31-2) in which the PTRS is arranged with reference to a symbol (e.g., leading symbol) in the data channel (e.g., PDSCH or PUSCH).

In the examples of FIG. 18, the control channel (PDCCH or PUCCH) is arranged in the leading symbol and the DMRS is arranged in the third symbol (SB) in one slot. The DMRS may be an FL-DMRS or A-DMRS. In addition, the data channel (PDSCH or PUSCH) is arranged in a region from the second symbol (SB2) to the fourteenth symbol (SB14), in which the DMRS or the PTRS is not arranged.

In arrangement method a31-1, the PTRSs are arranged every two symbols with reference to the second symbol (SB2) (in other words, the leading symbol of the data channel) in one slot. For example, the PTRSs are arranged in SB2, SB4, SB6, SB8, SB10, and SB12. Since reference symbol SB2 belongs to the data channel, it is allowed to be arranged with the PTRS.

Arrangement method a31-2 is an example in which the PTRS insertion density in one slot is lower than in arrangement method a31-1. For example, in arrangement method a31-2, the PTRSs are arranged every four symbols with reference to the second symbol (SB2) (in other words, the leading symbol of the data channel) in one slot. For example, the PTRSs are arranged in SB2, SB6, SB10, and SB14. Since reference symbol SB2 belongs to the data channel, it is allowed to be arranged with the PTRS.

It is advantageous from the viewpoint of implementation that the PTRS arrangement position is uniquely determined in the data channel according to arrangement methods a31-1 and a31-2.

(Fourteenth Example of PTRS Arrangement Method)

Figure 19:
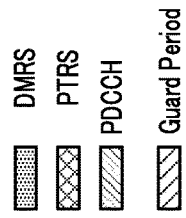
FIG. 19 illustrates a fourteenth example of the PTRS arrangement method according to one embodiment.
Figure 19:
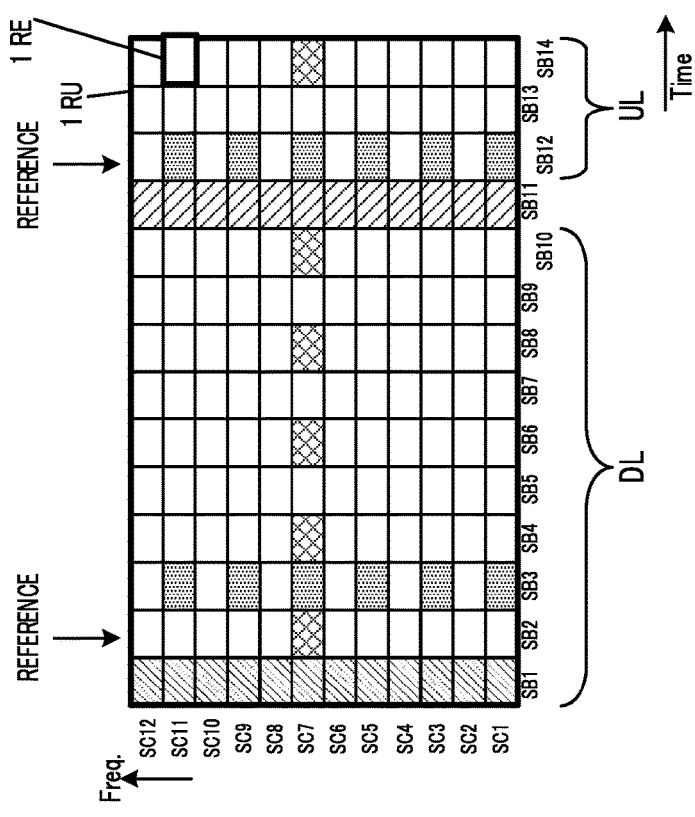

FIG. 19 illustrates a fourteenth example of the PTRS arrangement method according to one embodiment. FIG. 19 illustrates a arrangement example (PTRS arrangement method a32) for the case where the UL and DL periods coexist within one slot (which may be a mini slot, alternatively).

For example, ten symbols (SB1 to SB10) among 14 symbols (SB1 to SB14) belong to the DL period, and three symbols (SB12 to SB14) among the 14 symbols belong to the UL period. SB11 may be a period (guard period) for switching between DL and UL. The signal of the control channel (e.g., PDCCH or PUCCH) is arranged in the leading symbol (SB1) in the DL period.

The DMRSs are arranged in the third symbol (SB3) in the DL period and in the starting symbol (SB12) in the UL period. The DMRS arranged in SB3 may be an FL-DMRS and the DMRS arranged in SB12 may be an FL-DMRS or A-DMRS, or may simply be a DMRS.

In arrangement method a32, the PTRSs may be arranged using the respective starting symbols (SB2 and SB12) of the data channel in the DL and UL periods.

For example, in the case where the PTRSs are arranged every two symbols, the PTRSs are arranged in SB2, SB4, SB6, SB8, and SB10 in the DL period with reference to the starting symbol (SB2) of the DL data channel.

In the UL period, the PTRS is arranged in SB14, for example, with reference to the starting symbol (SB12) of the UL data channel. In the example of FIG. 19, the PTRS is not arranged in reference symbol SB12 since the DMRS is arranged in SB12.

It is advantageous from the viewpoint of implementation that the PTRS arrangement position is uniquely determined in each of the UL and DL data channels according to arrangement method a32.

Although the indices assigned to symbols may be different between in the DL period and in the UL period, this is acceptable as long as symbols corresponding to the starting symbols of the data channel in the DL period and/or the UL period are used for an arrangement reference for PTRS.

The PTRSs may also be arranged with reference to end symbols of the data channels in the DL period and/or the UL period. The PTRS in one of the DL and UL periods may be arranged with reference to the starting symbol or end symbol in the other one of the DL and UL periods.

As described above, according to the embodiment including the aforementioned various PTRS arrangement methods, the phase fluctuation in the propagation channel of the radio link signal can be effectively corrected. Consequently, the quality degradation of the radio link signal due to the effect of phase noise, for example, can be prevented.

(Variation)

Figure 20:
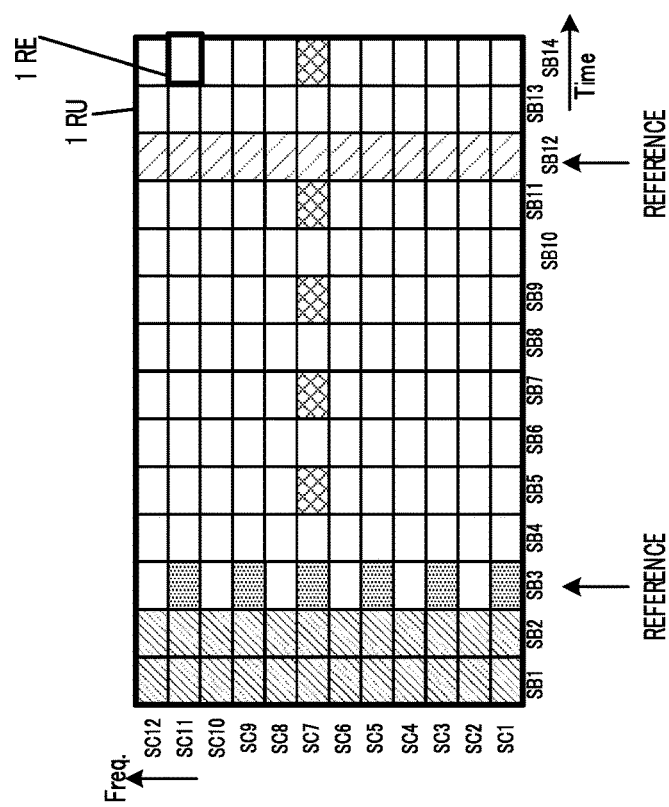
FIG. 20 illustrates an example of variation of the PTRS arrangement method according to one embodiment.

In the case where the A-DMRS is arranged in addition to the FL-DMRS in one slot as illustrated in FIG. 20, the PTRS arranged in the backward of the A-DMRS may be arranged with reference to the A-DMRS.

For example, in a case where the FL-DMRS is arranged in the third symbol (SB3) in one slot and the A-DMRS is arranged in the twelfth symbol (SB12) in one slot, the PTRS arranged after the thirteenth symbol (SB13) may be arranged with reference to SB12. For example, the PTRS may be arranged in SB14 when the PTRSs are arranged every two symbols. The PTRSs arranged in the front of the symbol (SB12) that is arranged with the A-DMRS may be arranged with reference to SB3 that is arranged with the FL-DMRS. For example, the PTRSs are arranged in SB5, SB7, SB9, and SB11.

When there is a collision arising between the PTRS and another RS (e.g., CSI-RS), said PTRS (and subsequent PTRSs) may be punctured or shifted in the time and/or frequency direction. The "CSI-RS" is the abbreviation for "Channel State Information Reference Signal."

FIGS. 21 to 24 illustrate examples where, when the PTRSs are arranged every four symbols, there is a collision between the PTRS and another RS in SB11. In the examples of FIGS. 21 to 24, the other RS is arranged over two symbols of SB10 and SB11 and all of SC1 to SC12 (which may, however, be a part of SC1 to SC12). Thus, the collision arises between the PTRS and the other RS in SB11 boxed with bold lines in FIGS. 21 to 24.

Figure 21:
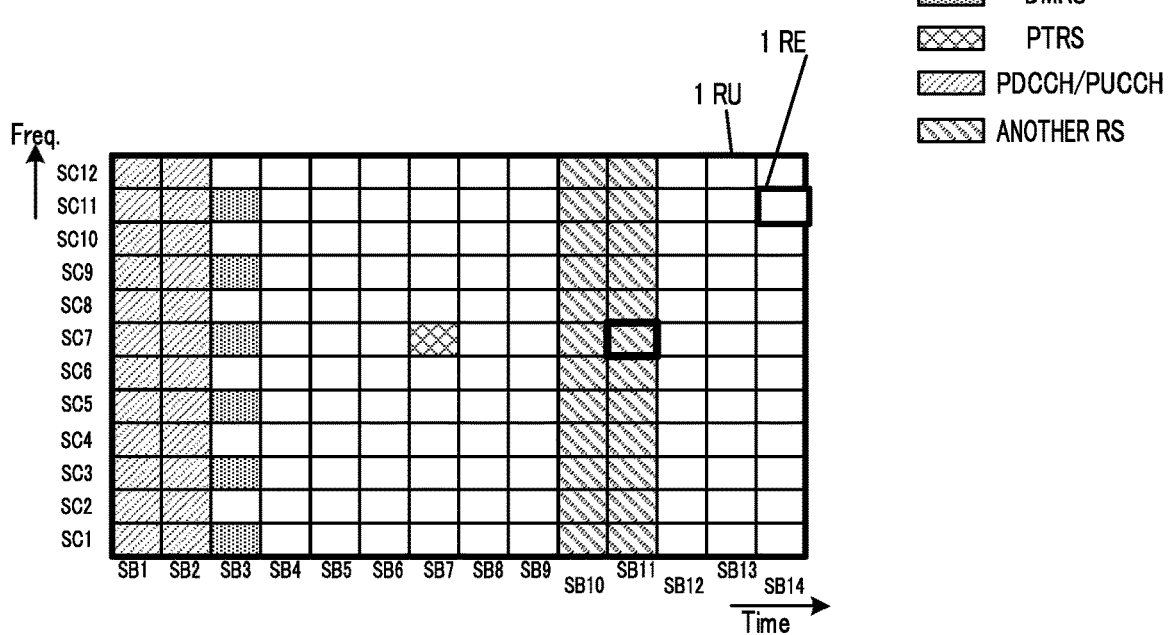
FIG. 21 illustrates an example of variation of the PTRS arrangement method according to one embodiment.

In the example of FIG. 21, the PTRS collided with the other RS in SB11 (this PTRS may hereinafter be referred to as "collision PTRS" for convenience) is punctured.

Figure 22:
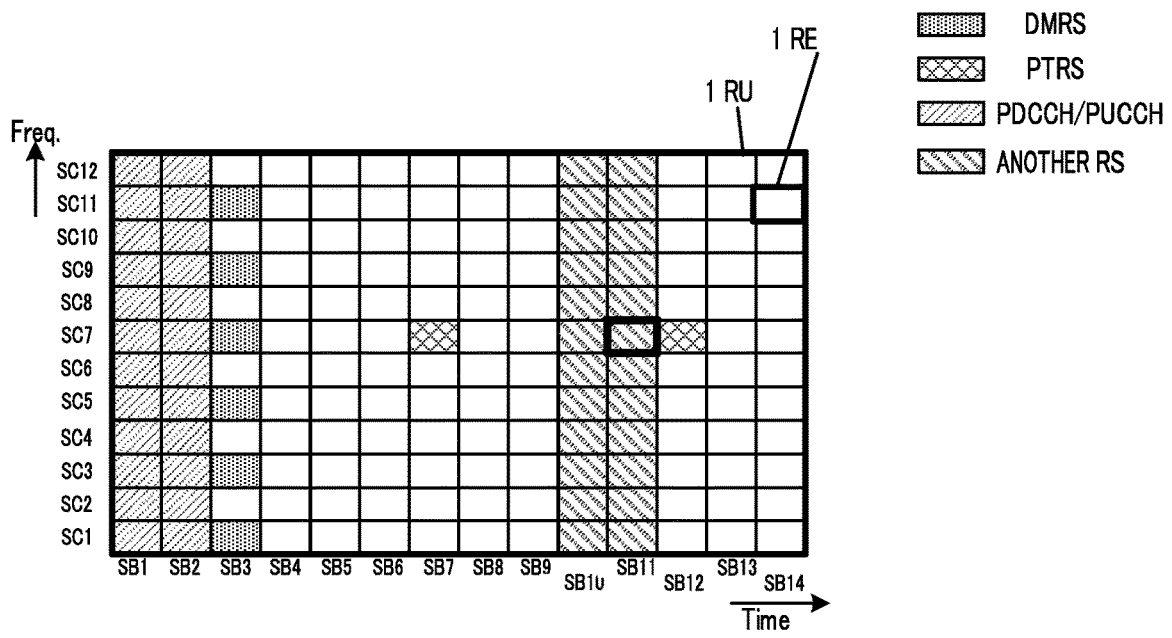
FIG. 22 illustrates an example of variation of the PTRS arrangement method according to one embodiment.

In the example of FIG. 22, the PTRS collided with the other RS in SB11 is shifted backward in the time direction (e.g., to SB12). The collision PTRS may be shifted to SB13 or a subsequent symbol in the example of FIG. 22. In other words, the number of symbols by which the collision PTRS is shifted (this number of symbols may also be referred to as "shift amount") is not limited to one symbol, but may also be two or more symbols. The same point that the shift amount is not limited to one symbol applies to the example of FIG. 23. However, since the phase fluctuation tracking performance may decrease with increasing arrangement interval among the PTRSs, it is preferable that the shift amount be as small as possible within a range where collision with the other RS is avoidable.

Figure 23:
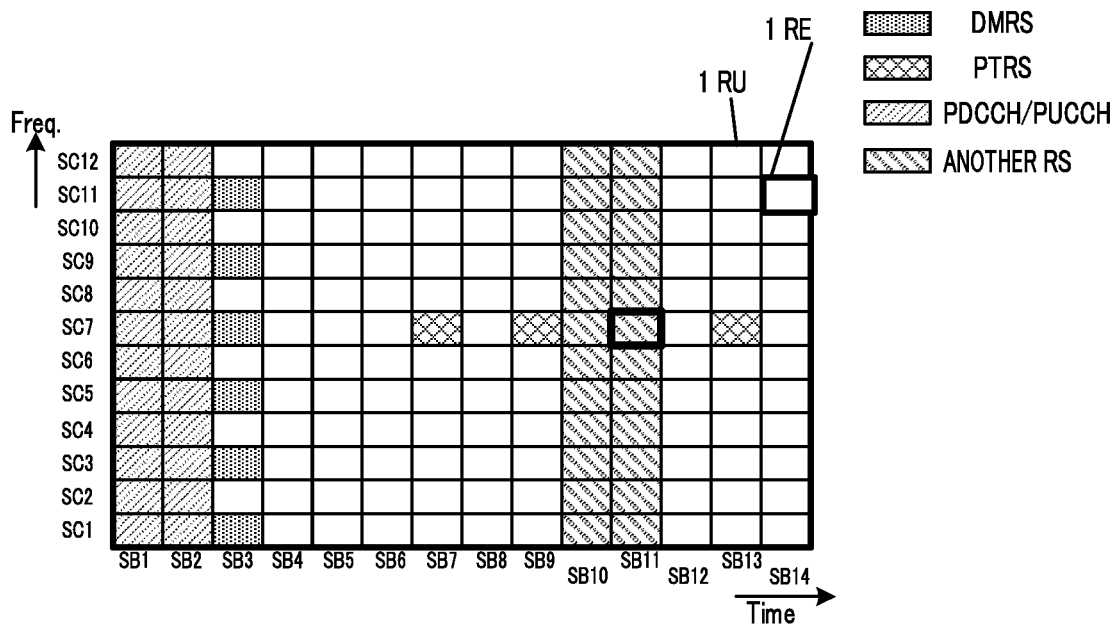
FIG. 23 illustrates an example of variation of the PTRS arrangement method according to one embodiment.

In the example of FIG. 23, the PTRS collided with the other RS in SB11 is shifted forward in the time direction (e.g., to SB9).

In the examples of FIGS. 22 and 23, the PTRS to be shifted may be limited to the PTRS collided with the other RS, or the PTRS non-collided with the other RS may also be shifted following the shift of the collision PTRS. In the example of FIG. 23, the collision PTRS is shifted to SB9, so that an interval between the PTRS in SB9 and the PTRS arranged in SB7 preceding SB9 is one symbol. In accordance with this interval, an interval for the PTRSs arranged in the backward of SB9 may be adjusted. In the example of FIG. 23, SB11 and SB13 are candidate symbols in which the PTRS may be arranged. However, since the other RS is arranged in SB11, the PTRS can be arranged in SB13.

Figure 24:
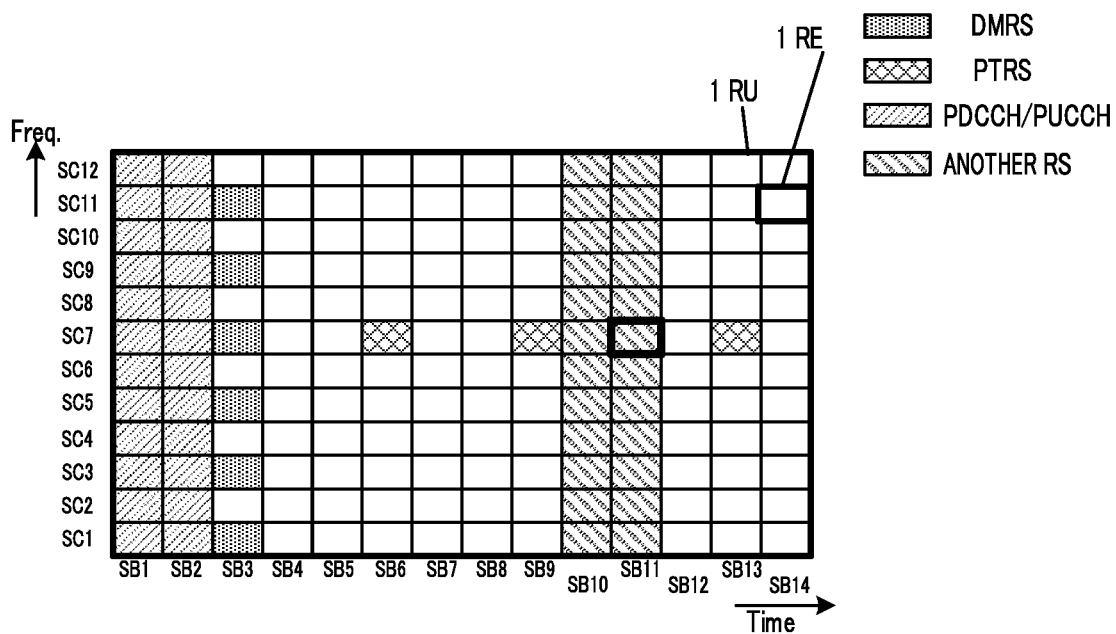
FIG. 24 illustrates an example of variation of the PTRS arrangement method according to one embodiment.

Although the PTRS arranged in the symbol (SB7) that precedes the collision PTRS is not shifted in the example of FIG. 23, the PTRS preceding the collision PTRS may also be shifted forward (e.g., to SB6) according to the forward shift amount of the collision PTRS as illustrated in FIG. 24.

A plurality of PTRSs including the collision PTRS may as a whole be shifted backward or forward while the initial arrangement interval is kept in the example of FIGS. 22 and 23.

Figure 25:
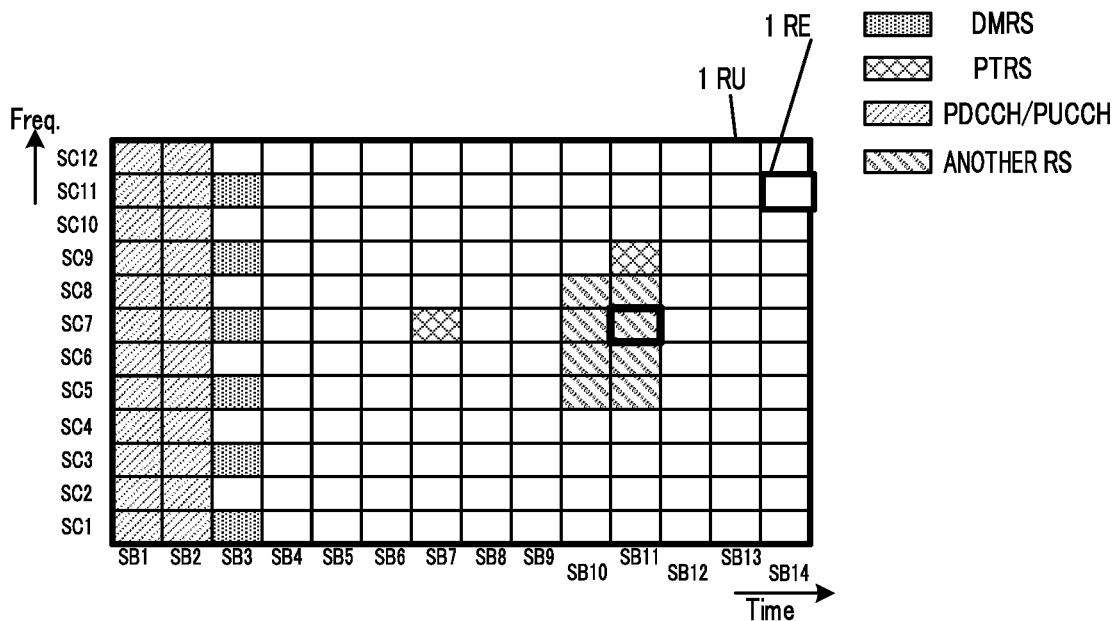
FIG. 25 illustrates an example of variation of the PTRS arrangement method according to one embodiment.
Figure 26:
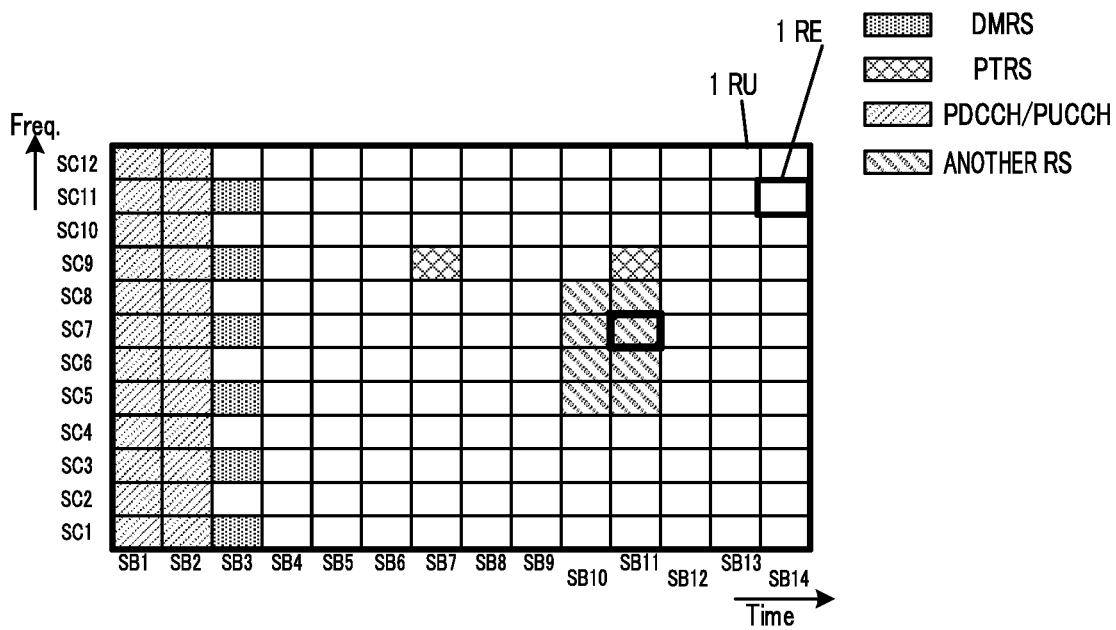
FIG. 26 illustrates an example of variation of the PTRS arrangement method according to one embodiment.

The direction in which the collision PTRS is shifted is not limited to the time direction, but may be the frequency direction as illustrated in FIGS. 25 and 26. In the examples of FIGS. 25 and 26, the other RS is arranged over two symbols of SB10 and SB11 and from SC5 to SC8. Thus, the collision arises between the PTRS and the other RS in SB11 boxed with bold lines in FIGS. 25 and 26.

The collision PTRS is shifted on the high-frequency side (e.g., to SC9) in the example of FIG. 25. However, the collision PTRS may be shifted on the low-frequency side (e.g., to SC4). The example of FIG. 26 is an example in which the PTRS arranged in SB7 that precedes the collision PTRS is also shifted on the high-frequency side (e.g., to SC9) according to the shift of the collision PTRS on the high-frequency side (e.g., to SC9). In other words, the example of FIG. 26 is an example in which a plurality of PTRSs arranged in the time direction are as a whole shifted on the high-frequency side. However, a plurality of PTRSs arranged in the time direction may as a whole be shifted on the low-frequency side.

Also in the examples of FIGS. 25 and 26, in order to prevent a decrease in phase fluctuation tracking performance, it is preferable that the PTRS shift amount in the frequency direction be as small as possible within a range where collision with the other RS is avoidable.

(Notification of Information on PTRS Arrangement Position)

In connection with the DL communication and/or UL communication, radio base station 10 may notify user terminal 20 of information on the PTRS arrangement methods (or arrangement positions) as described above, or user terminal 20 may notify radio base station 10 of such information in connection with the UL communication.

The "information to be notified" may be an offset value indicating a PTRS insertion starting position (the offset value may, e.g., be denoted by X). X may be in a range of from 0 to 13, for example. A symbol(s) used for the arrangement reference for offset value X may be any one of the following (1a) to (3a):

(1a) a symbol in which a DMRS is arranged;

(2a) a leading symbol within an individual slot (or mini slot); and (3a) a leading symbol of a data channel.

The arrangement reference listed by way of example at above (1a) to (3a) may be understood to correspond to the arrangement reference described in the arrangement methods illustrated with reference to FIGS. 6 to 19.

When the DMRS is arranged over two symbols in the case of (1a) (e.g., in the cases of the arrangement methods illustrated in FIGS. 9, 10, and 11), one of the two symbols in which the DMRS is arranged may be used for the arrangement reference as described with reference to FIGS. 9, 10, and 11.

In addition, "the information to be notified" may be an index (e.g., Y) related to the PTRS insertion starting position. Index Y may be index values respectively given to a plurality of configuration value candidates, or may be a collective index value given to a plurality of configuration value candidates. The signaling size for notification can be made smaller by using index Y than in the case where the configuration values themselves are notified.

Index Y may be associated with at least one of information pieces indicating the following (1b) to (3b).

(1b) Offset value indicative of a PTRS insertion starting position.

(2b) Symbol used for an arrangement reference.

(3b) PTRS insertion interval.

The association makes it possible to implicitly specify a PTRS arrangement position, and thus, to reduce signaling for notification.

Any of the following (1c) to (3c) may be applied as the notification method:

(1c) higher layer configuration;

(2c) MAC/PHY signaling; and (3c) hybrid indication using the combination of (1c) and (2c).

For example, Radio Resource Control (RRC) or Medium Access Control (MAC) signaling may be applied as the notification of the information on the PTRS arrangement position, or physical layer (PHY) signaling may be applied as such notification.

(Combination of PTRS Arrangement Methods)

Additionally or alternatively, the PTRS arrangement methods illustrated in FIGS. 6 to 26 may be appropriately combined to be applied. For example, any of the arrangement methods based on the DMRS arrangement as illustrated in FIGS. 6 to 13 may be applied for the DL[sic] communication, and the arrangement methods not based on the DMRS arrangement as illustrated in FIGS. 14 to 17 may be applied for the DL communication.

Additionally or alternatively, for example, any of the arrangement methods not based on the DMRS arrangement as illustrated in FIGS. 14 to 17 may be applied forward of the FL-DMRS, and any of the arrangement methods based on the DMRS arrangement as illustrated in FIGS. 6 to 13 may be applied backward of the FL-DMRS.

(Others)

Additionally or alternatively, any of the PTRS arrangement methods illustrated in FIGS. 6 to 26 may be configured in the higher layer, and the PTRS may be arranged in accordance with the configured arrangement method.

Additionally or alternatively, the size (the number of symbols) of the control channel (PDCCH and/or PUCCH) in the time direction is not limited to two, and may e.g., be zero, one, or three. The PDCCH signal may also be inserted in a part of a symbol.

Additionally or alternatively, the DMRS arrangement position is not limited to the third symbol in one slot. For example, the DMRS arrangement position may be at the fourth symbol in one slot, at the leading symbol of the data channel (e.g., PUSCH), or at the second symbol of the PUSCH.

Additionally or alternatively, the number of symbols of DMRS is not limited to one. For example, the DMRS may be arranged over two symbols of the third and the fourth symbols in one slot, or may be arranged over two symbols of the fourth and the fifth symbols in one slot.

Terminology

The DMRS may also be called a demodulation RS. The DMRS may include the FL-DMRS alone or include both of the FL-DMRS and A-DMRS. The PDSCH may be called a downlink data channel. The PUSCH may be called an uplink data channel. The PDCCH may be called a downlink control channel. The PUCCH may be called an uplink data channel.

The embodiments have been described above.

(Hardware Configuration)

The block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 27:
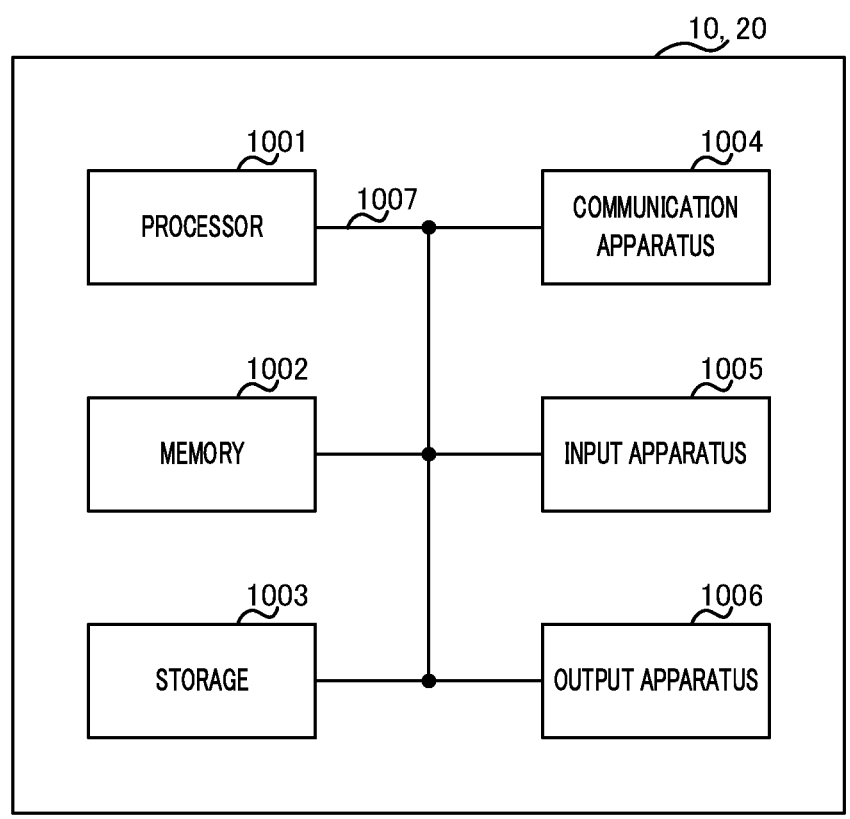
FIG. 27 illustrates an example of hardware configuration of a radio base station and a user terminal according to one embodiment.

For example, radio base station 10 and user terminal 20 according to an embodiment may function as a computer that executes processing of a radio communication method of the present invention. FIG. 27 illustrates an example of hardware configuration of radio base station 10 and user terminal 20 according to one embodiment of the present invention. The aforementioned Radio base station 10 and user terminal 20 may be physically constituted by a computer apparatus including processor 1001, memory 1002, storage 1003, communication apparatus 1004, input apparatus 1005, output apparatus 1006, bus 1007, for example.

The term "apparatus" in the following description can be replaced with a circuit, a device, or a unit, for example. The hardware configurations of radio base station 10 and of user terminal 20 may include one apparatus or a plurality of apparatuses illustrated in the drawings or may not include part of the apparatuses.

For example, although one processor 1001 is illustrated, there may be a plurality of processors. The processing may be executed by one processor, or the processing may be executed by one or more processors at the same time, in succession, or in another manner. The processor 1001 may be implemented by one or more chips.

The functions in radio base station 10 and user terminal 20 are implemented by predetermined software (program) loaded into hardware, such as processor 1001, and memory 1002, for example, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, and register, for example. For example, The aforementioned scheduler 101, transmission signal generator 102 and 206, coding and modulation section 103 and 207, mapper 104 and 208, controller 108 and 203, channel estimator 109 and 204, demodulation and decoding section 110 and 205 may be implemented by processor 1001.

Processor 1001 reads out a program (program code), a software module, or data from storage 1003 and/or communication apparatus 1004 to memory 1002 and executes various types of processing according to the read-out program, for example. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. The program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, or a main memory (main storage apparatus), for example. Memory 1002 can save a program (program code), and a software module, for example, can be executed to carry out the radio communication method according to an embodiment.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, the aforementioned transmitter 105 and 209, antennas 106 and 201, and receiver 107 and 202 may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

The terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" may be interchangeably used in the present specification. The base station may be called a fixed station, a NodeB, an eNodeB (eNB), a gNodeB (gNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. In addition, the DMRS may be call by other corresponding names, e.g., demodulation RS, DM-RS, and the like.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot may be called a TTI, or one mini slot may be called a TTI.

The resource unit is a resource allocation unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource allocation unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in relation to one embodiment, it is obvious to those skilled in the art that the present invention is not limited to the embodiment described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio base station
20 User terminal
101 Scheduler
102, 206 Transmission signal generator
103, 207 Coding and modulation section
104, 208 Mapper
105, 209 Transmitter
106, 201 Antenna
107, 202 Receiver
108, 203 Controller
109, 204 Channel estimator
110, 205 Demodulation and decoding section

The invention claimed is:

1. A terminal comprising:
a processor configured to map a phase tracking reference signal, PTRS, to at least one symbol used for an uplink shared channel starting from a leading symbol of the uplink shared channel; and
a transmitter configured to perform transmission processing for the uplink shared channel and the PTRS,
wherein the processor sets a reference for mapping the PTRS to a second symbol when the transmitter transmits a demodulation reference signal, DMRS, using a first symbol and the second symbol in the uplink shared channel.

2. The terminal according to claim 1, wherein the processor maps the PTRS to a different symbol with reference to a symbol used for the DMRS when the symbol to which the PTRS is mapped overlaps with the symbol used for the DMRS.

3. The terminal according to claim 1, wherein the processor determines, based on an arrangement method, the symbol to which the PTRS is mapped.

4. A terminal comprising:
a receiver configured to perform reception processing for a downlink shared channel; and
a processor configured to determine at least one symbol to which a phase tracking reference signal, PTRS, is mapped in the downlink shared channel starting from a leading symbol in the downlink shared channel,
wherein the processor determines that a reference for mapping the PTRS is a second symbol in the downlink shared channel when a demodulation reference signal, DMRS, is mapped to a first symbol and the second symbol in the downlink shared channel.

5. The terminal according to claim 4, wherein
the receiver receives information on a mapping of the PTRS, and
the processor determines that the PTRS is mapped to a different symbol with reference to a symbol used for the DMRS based on the information on the mapping and when the symbol to which the PTRS is mapped overlaps with the symbol used for the DMRS.

6. The terminal according to claim 4, wherein the processor determines, based on an arrangement method, the symbol to which the PTRS is mapped.

7. A base station comprising:
a processor configured to map a phase tracking reference signal, PTRS, to at least one symbol used for a downlink shared channel starting from a leading symbol in the downlink shared channel; and a transmitter configured to perform transmission processing for the downlink shared channel and the PTRS, wherein a reference for mapping the PTRS is a second symbol in the downlink shared channel when the processor maps a demodulation reference signal, DMRS, to a first symbol and the second symbol in the downlink shared channel.

* * * * *